United States Patent [19]
Watanabe et al.

[11] Patent Number: 6,045,269
[45] Date of Patent: Apr. 4, 2000

[54] MULTICORE OPTICAL CONNECTOR AND METHOD OF PRODUCING THE CONNECTOR

[75] Inventors: Tomohiro Watanabe; Kazunori Watanabe; Tsunetoshi Saito; Etsuzo Sato; Toshihiko Ota, all of Chiba; Nobuo Tomita, Jyohoku Machi, all of Japan

[73] Assignees: The Furukawa Electric Co., Ltd.; Nippon Telegraph and Telephone Corporation, both of Tokyo, Japan

[21] Appl. No.: 09/043,987

[22] PCT Filed: Jul. 31, 1997

[86] PCT No.: PCT/JP97/02670
§ 371 Date: Mar. 30, 1998
§ 102(e) Date: Mar. 30, 1998

[87] PCT Pub. No.: WO98/05989
PCT Pub. Date: Feb. 12, 1998

[30] Foreign Application Priority Data

Aug. 1, 1996 [JP] Japan .................................. 8-219435

[51] Int. Cl.[7] ...................................................... G02B 6/38
[52] U.S. Cl. ................................ 385/59; 385/58; 385/65; 385/114; 385/83; 385/80
[58] Field of Search ................................ 385/58, 59, 65, 385/114, 83, 50, 51

[56] References Cited

U.S. PATENT DOCUMENTS

| | | | |
|---|---|---|---|
| 4,046,454 | 9/1977 | Pugh, III | 385/59 X |
| 5,121,459 | 6/1992 | Chiang | 385/120 |
| 5,185,846 | 2/1993 | Basavanhally et al. | 385/137 |
| 5,259,050 | 11/1993 | Yamakawa et al. | 385/59 |
| 5,379,361 | 1/1995 | Maekawa et al. | 385/65 |
| 5,430,819 | 7/1995 | Sizer, II et al. | 385/59 |
| 5,471,555 | 11/1995 | Braga et al. | 385/136 |
| 5,689,599 | 11/1997 | Shadid | 385/83 |
| 5,727,097 | 3/1998 | Lee et al. | 385/58 |
| 5,727,102 | 3/1998 | Jeong et al. | 385/59 |
| 5,845,026 | 12/1998 | Lee et al. | 385/58 |
| 5,974,214 | 10/1999 | Shacklette et al. | 385/50 |

FOREIGN PATENT DOCUMENTS 60-161304  10/1995  Japan .................................. 385/59 X

*Primary Examiner*—Brian Healy
*Attorney, Agent, or Firm*—Lacasse & Associates; Randy W. Lacasse; Wesley L. Strickland

[57] ABSTRACT

The invention relates to a small-sized multiple-core optical connector having high reliability, which can be easily assembled and manufactured. A plurality of array guide grooves (22) are arrayed and formed on a flat substrate (21). The array pitch interval of the array guide grooves is roughly coincident with the outer diameter of bare optical fibers (4a), (4b). The first optical fiber tape (6a) and the second optical fiber tape (6b) are disposed at the rear end side of the flat substrate (21) so as to overlap each other, wherein the first bare optical fibers (4a) of the first optical fiber tape (6a) and the second bare optical fibers (4b) of the second optical fiber tape (6b) are alternately array-converted and accommodated in the array guide grooves (22). The bare optical fibers (4a), (4b) are pressed from the upside of the bare optical fibers (4a),(4b) at the tip end side of the array, and they are placed and fixed in the array guide grooves. A filter insertion groove (17) is formed in the direction crossing the corresponding array guide grooves (22) at an area where the array guide grooves (22) are formed, a filter (16) is inserted into the filter insertion groove (17), and the filter (16) is attached to each of the second bare optical fibers (4b) at the second optical fiber tape (6b) side.

20 Claims, 20 Drawing Sheets

Fig. 10
(a)
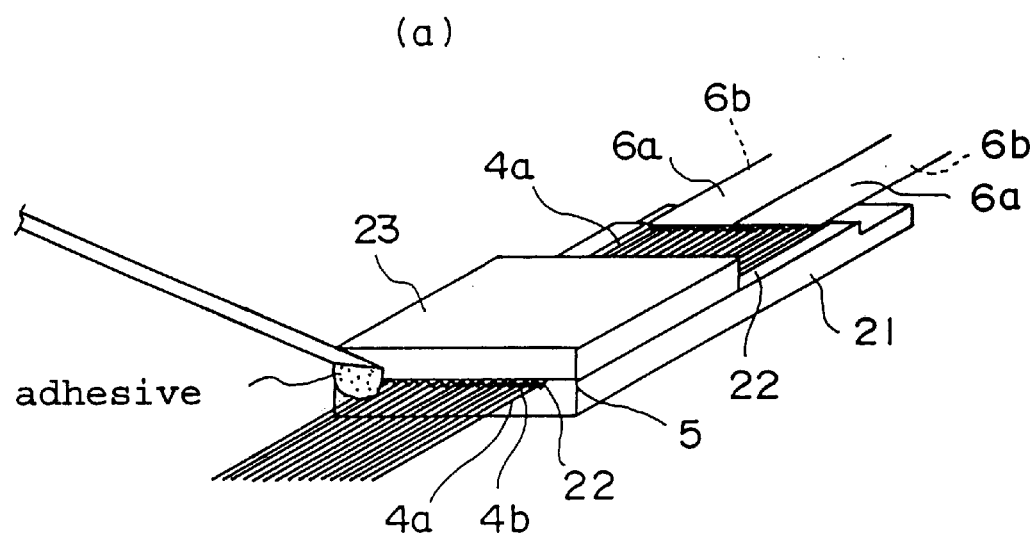
(b)
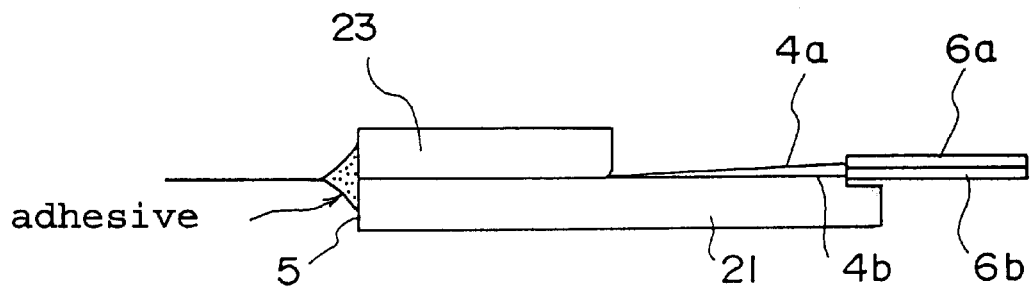

MULTICORE OPTICAL CONNECTOR AND METHOD OF PRODUCING THE CONNECTOR

TECHNICAL FIELD

The present invention relates to a multiple-core optical connector used for optical communications, etc., and its manufacturing method.

BACKGROUND ART

FIG. 26 shows a cross-sectional view of a general optical fiber cored line 3 as an optical fiber. As shown in the same drawing, the optical fiber cored line 3 has a bare optical fiber 4, the outer diameter of which is approximately 125 μm, formed with a clad 9 around the core 8, wherein the bare optical fiber 4 is further covered with a primary coat 15 and a nylon jacket 10, etc. still further covers the outer circumference thereof. The outer diameter of the optical fiber cored line 3 is, for example approximately 250 μm, which is formed to be almost two times the outer diameter of the bare optical fiber 4.

A multiple-core optical connector has been widely used as an optical fiber connecting member by which a plurality of such optical fiber cored lines 3 are collectively connected. FIG. 27 shows an example of a conventional multiple-core optical connector. In the same drawing, an optical fiber tape 6 which is composed by juxtaposing a plurality (four in the drawing) of optical fiber cored lines 3 so as to be band-like is inserted into and fixed in a ferrule 2 used as an optical fiber arraying member, thereby forming a multiple-core optical connector, wherein the optical fiber cored lines 3 of the optical fiber tape 6 are inserted into the ferrule 2 in such a state where coatings, such as nylon jacket 10 and primary coat 15 (FIG. 26), located at the tip ends thereof are eliminated, and they are arrayed at an appointed array pitch so that the end faces of the bare optical fibers 4 which are exposed by eliminating the coatings are exposed to the connection end face 5 of the ferrule.

Furthermore, the ferrule 2 is usually formed by molding resin, etc., and, at the connection end face 51 a plurality (four in the drawing) of bores or grooves, such as optical fiber insertion holes 13, etc., for arraying the bare optical fibers 4 at an appointed pitch are disposed with a spacing at a pitch which is two times the outer diameter of the bare optical fibers 4, wherein by inserting the bare optical fibers 4 into the optical insertion holes 13, the bare optical fibers 4 may be disposed at a pitch (2 r) which is equal to two times the outer diameter (r) of the bare optical fibers 4.

However, recently, it becomes possible to carry out not only mutual connections of optical fiber cored lines 3 but also connections of waveguide elements, in which a plurality of optical waveguides are incorporated, with multiple-core optical connectors by connecting optical connectors to each other. Therefore, optical connectors in which more optical fiber cored lines 3 such as eight-core (8-core), sixteen-core (16-core), etc. are incorporated has been developing in compliance with a circuit configuration of waveguide elements. Furthermore, in line with high concentration of optical communications, multiple-core optical connectors, in which much more optical fiber cored lines such as thirty-two cores, sixty-four cores, etc. are incorporated, are desired for the purpose of high concentration.

Actually however, with a conventional multiple-core optical connector as shown in FIG. 27, the arraying pitch of bare optical fibers 4 of an optical fiber cored line 3 is formed to be approximately two times (for example, approximately 250 μm) the outer diameter of the bare optical fibers 4. Therefore, in a case where it is assumed that the width of the marginal allowance B for reinforcement at both sides of the optical fiber arraying area is 1,000 μm, in a multiple-core optical fiber connector of four cores as shown in FIG. 27, the element width thereof will be 3 mm (250 μm×the number of cores+1,000 μm×2), and as regards a multiple-core optical fiber connector of eight cores, the element width thereof will be 4 mm. Furthermore, the element width will be 6 mm for sixteen cores, 10 mm for thirty-two cores, and 18 mm for sixty-four cores, respectively.

Thus, the dimension of a multiple-core optical fiber connector is made remarkably large in line with an increase of the number of cores of optical fiber cored line 3 to be arrayed on a multiple-core optical connector. Therefore, there is a problem that, in a case where a multiple-core optical connector having many cores is produced, the number of production of waveguide elements in a wafer is remarkably decreased when the waveguide elements are formed by using the same wafer. Furthermore, as the element dimension is increased, the waveguide elements are made bulky and constitute an obstacle in incorporating multiple-core optical fiber connectors in optical communication systems, whereby another problem arises, by which the high concentration is hindered.

Furthermore, recently, another type of multiple-core optical connector is requested, which is able to alternately make light of different wavelengths incident into optical waveguide in the arrayed order thereof, that is, wherein when a plurality of optical waveguides are juxtaposed and formed on a waveguide element, light of wavelength λ1 is made incident into waveguides of odd numbers, for example, the 1st, 3rd, 5th waveguides, etc. and light of wavelength λ2 is made incident into optical waveguides of even numbers while each light of of the same wavelength is able to be collectively propagated by picking up light of wavelength λ1 from optical waveguides of odd numbers and light of wavelength λ2 from optical wavelengths of even numbers. However, no multiple-core optical connector having such features has been proposed before.

Therefore, in Japanese laid-open patent publication no. 246887 of 1995, the present applicant proposed a multiple-core optical connector which can be formed to be small-sized even though the number of cores of an optical fiber (optical fiber cored line) to be arrayed is large, and hopefully which can collectively propagate every light of the same kind by alternately causing different light to be made incident into a plurality of juxtaposed optical waveguides, etc. in the order of juxtaposition and alternately picking up different light from optical waveguides, etc. in the arrayed order thereof.

FIG. 24 shows a multiple-core optical connector proposed by the applicant. As shown in the same drawing, the proposed multiple-core optical connector is composed so as to have an optical fiber tape 6 and a ferrule 2. FIG. 25 shows the construction of the ferrule 2.

Furthermore, in order to easily understand the features of the proposed optical connector, although in FIG. 24 the size of the optical fiber tape 3, etc. is exemplarily illustrated in enlargement with respect to the ferrule 2, actually as shown in FIG. 25, the width $W_1$ of the optical fiber tape 6 is formed to be small, for example, one-third or less the width $W_2$ of the ferrule 2. Furthermore, in FIG. 25, (a) is a bottom view of the ferrule 2, (b) is a cross-sectional view taken along the line A—A in (a), (c) is a front elevational view thereof, and (d) is a rear side view thereof.

As shown in FIG. 24, the proposed multiple-core optical connector has the first optical fiber tape 6a which is composed by juxtaposing the first four optical fiber cored lines 3a to be band-like and the second optical fiber tape 6b which is composed by juxtaposing the second four optical fiber fiber cored lines 3b to be band-like, so that the first optical fiber tape 6a and the second optical fiber tape 6b are overlapping each other. As shown in FIG. 22(a), the first bare optical fiber 4a and the second bare optical fiber 4b, the coatings of which consisting of nylon jacket 10 and primary coat 15 at the tip end of each of these optical fiber tapes 6a,6b are removed, are array-converted so as to be alternately disposed. As shown in FIG. 22(b), this array-conversion is performed by alternately disposing the first bare optical fiber 4a and the second bare optical fiber 4b with the nylon jacket 10 and primary coat 15 removed, so that the second bare optical fibers 4b are respectively inserted into each spacing (about 125 μm) formed between the respective first bare optical fibers 4a.

As shown in FIG. 25, an optical fiber tape insertion portion 18 into which optical fiber tapes 6a,6b are inserted is formed to be like a horizontal hole at the rear connection end face 11 side of the ferrule 2, and an adhesive pouring port 20 is formed at the bottom side of the ferrule 2 at the tip end side of the optical fiber tape insertion portion 18. The vertical opening width of the optical fiber tape insertion portion 18 is formed so as to have an opening width corresponding to the total thickness of the thickness of the first optical fiber tape 6a and that of the second optical fiber tape 6b, so that the first optical fiber tape 6a and the second optical fiber tape 6a can be inserted therethrough in a mutually overlapped state.

A wave-like U-shaped groove in which the first and second bare optical fibers 4a,4b are disposed is formed at the tip end side of the optical fiber tape insertion portion 18, and the U-shaped groove forms an optical fiber insertion hole 13. The arraying pitch of the optical fiber insertion holes 13 is formed to be roughly coincident with the outer diameter r (r≈125 μm) of the respective bare optical fibers 4a,4b, that is, the outer diameter of the respective optical fiber cored lines 3a,3b with their coatings eliminated, wherein the optical fiber insertion holes 13 are juxtaposed in a row without any clearance.

The optical fiber tapes 6a, 6b in which the first and second bare optical fibers 4a, 4b are array-converted are inserted into the ferrule 2 as shown in FIG. 22. Accordingly, the first and second bare optical fibers 4a, 4b are alternately inserted into the optical fiber insertion holes 13 of the ferrule 2 and are arrayed in the ferrule 2 at an arraying pitch which is almost coincident with the outer diameter of the respective bare optical fibers 4a,4b, wherein the respective optical fiber tapes 6a, 6b are fixed in the optical fiber tape insertion portion 18 with an adhesive poured through the adhesive agent pouring port 20, thereby causing the proposed multiple-core optical connector to be formed.

With the proposed multiple-core optical connector, since the arraying pitch of bare optical fibers 4a, 4b at the tip end side (connection end face side) of the optical fiber tapes is formed to be an arraying pitch of a size which is roughly coincident with the outer diameter of bare optical fibers 4a, 4b, an effect can be obtained, by which a remarkably small-sized multiple optical connector can be formed in comparison with a conventional multiple-core optical connector formed by arraying eight bare optical fibers 4 at a pitch of 250 μm.

Furthermore, the bare optical fibers 4a, 4b which respectively form the first optical fiber tape 6a and the second optical fiber tape 6b are array-converted to be in a row so that they are arrayed at the connection end face 5 side of the multiple-core optical connector. Therefore, for example, as shown in FIG. 24, in a case where light of wavelength λ1 is made incident into each of the first optical fiber cored lines 3a of the first optical fiber tape 6a and light of wavelength λ2 is made incident into the second optical fiber cored lines 3b of the second optical fiber tape 6b, both light of wavelength λ1 and light of wavelength λ2 are respectively caused to propagate in the first optical fiber cored lines and the second optical fiber cored lines, whereby propagation channels of the light of wavelength λ1 and light of wavelength λ2 are array-converted at the conversion part where the bare optical fibers 4a, 4b are array-converted. Accordingly, light of wavelength λ1 outgoing from the first bare optical fibers 4a and light of wavelength λ2 outgoing from the second bare optical fibers 4b are caused to outgo from the tip end side (connection end face 5 side of the multiple-core optical connector) of the bare optical fibers 4a, 4b under a condition that they are placed in a row.

Therefore, for example, if a waveguide element in which a plurality of optical waveguides are juxtaposed is connected to the connection end face 5 side of the multiple-core optical fiber, it is possible to make light of wavelength λ1 and light of wavelength λ2 incident into each of the juxtaposed optical waveguides in their arrayed order, that is, light of wavelength λ1 can be made incident into waveguides of odd numbers, for example, the 1st, 3rd, 5th waveguides, etc. and light of wavelength λ2 can be made incident into optical waveguides of even numbers.

Furthermore, to the contrary, in a case where light of wavelength λ1 and light of wavelength λ2 are alternately caused to outgo from the respective optical waveguides of a waveguide element, in which a plurality of optical waveguides are juxtaposed, in the arrayed order of the optical waveguides, when the waveguide element is connected to a multiple-core optical connector according to the proposed embodiment, for example, the light of wavelength λ1 is made incident into the first bare optical fibers 4a, and the light of wavelength λ2 is made incident into the second bare optical fibers 4b.

Accordingly, as in the above example, since the optical propagation channel is array-converted at the array-conversion part of the bare optical fibers 4a, 4b, light of wavelength λ1 propagated in the first bare optical fibers 4a is collected and is caused to outgo from the first optical fiber tape 6a, and light of wavelength λ2 propagated in the second bare optical fibers 4b is collected and is caused to outgo from the second optical fiber tape 6b. Thus, by using the proposed multiple-core optical connector, an effect can be obtained, by which light of different wavelengths caused to outgo from the waveguide element, etc. in an alternately juxtaposed state can be shared to the first optical fiber tape 6a side and the second optical fiber tape 6b side, and the same can be picked up.

However, since the abovementioned multiple-core optical connector proposed by the applicant is such that a plurality of optical fiber insertion holes 13 are concentrated and arrayed at a pitch roughly coincident with the outer diameter of bare optical fibers 4, the coatings of which are removed, inside the tip end side of the ferrule 2 produced by molding resin, and these optical fiber insertion holes 13 have a very small hole diameter (for example, the diameter is about 126 μm) so that the bare optical fibers 4 are inserted without any play, it was very difficult to insert the bare optical fibers 4a, 4b at the tip end side into the optical fiber insertion holes 13 without any error in the array thereof after they are alternately array-converted in the correct order when the optical fiber tapes 6a, 6b, the coatings of which are removed, are overlapped and were inserted from the optical fiber tape insertion portion 18 side into the optical fiber insertion holes 13. Therefore, a problem arises in that the efficiency of assembling multiple-core optical connectors is low, and the assembling cost thereof is increased. It was disadvantageous that this problem would become remarkable in line with an increase of the number of cores of a multiple-core optical connector.

Furthermore, as described above, although it is usually performed that a multiple-core optical connector is connected to a quartz-oriented, etc. optical waveguide component (optical waveguide element), recently, a filter insertion type in which a filter is attached to an optical waveguide of the optical waveguide component has positively been developed. This is such that a plurality of waveguides of a 2×2 optical coupler (an optical coupler having two inputs and two outputs) as shown in FIG. 23(*a*) are juxtaposed and formed on a waveguide substrate, a filter 16 such as SWPF (short wave pass filter), etc. is attached to appointed ports (ports of odd numbers or even numbers) of the optical coupler, and the waveguide itself is caused to have a feature to transmit or interrupt light of a certain wavelength.

Such a filter-inserted type optical waveguide component is produced by forming a slit on a waveguide substrate, on which a waveguide is formed, in a pattern of crossing the waveguide and inserting a combtooth-like worked filter 16, shown in FIG. 23(*b*), into the slit.

However, since the waveguide substrate itself is very expensive and is abolished as a defective product if any trouble arises in the process of forming a slit into which the filter 16 is inserted, and inserting and fixing the filter, a problem arises, by which the production cost of waveguide components is increased, depending upon the yield ratio of these processes.

DISCLOSURE OF INVENTION

The invention was developed to solve these and other problems, and it is therefore an object of the invention to provide a multiple-core optical connector and its manufacturing method, which are able to decrease the assembling cost by facilitating the assembling work of multiple-core optical connectors, further are able to increase the yield of the production of expensive waveguide components by causing multiple-core optical connectors to have a filter inserted into and attached to waveguide components, and still further are able to decrease the total production cost of connector products between optical waveguide components and multiple-core optical connectors.

In order to achieve the abovementioned objects, the invention is provided with the following means. That is, the first aspect of a multiple-core optical connector according to the invention is a multiple-core optical connector in which the first optical fiber tape having a plurality of first optical fibers juxtaposed to be band-like and the second optical fiber tape having a plurality of second optical fibers juxtaposed to be band-like are disposed so as to overlap each other, the first optical fibers and second optical fibers having the coatings at the tip end side of the respective optical fiber tapes removed are array-converted so as to be alternately arrayed, and arrayed on an optical fiber arraying member, wherein the abovementioned optical arraying member has a plurality of array guide grooves formed on a flat substrate at an arraying pitch which is roughly coincident with the outer diameter of the abovementioned respective optical fibers with their coatings removed, the first optical fibers and the second optical fibers, the coatings of which are removed, are alternately arrayed in the array guide grooves, a pressing member is provided on the upper side of the arrayed optical fibers at the tip end side thereof, and the respective optical fibers are pressed by the pressing member, placed and fixed in the abovementioned array guide grooves, thereby causing the abovementioned problems to be solved.

The second aspect of a multiple-core optical connector according to the invention is constructed, in addition to the construction of the first aspect of the invention, so that a filter is provided in an area where the array guide grooves are formed, and the abovementioned filter is attached to at least any one of the first optical fibers and the second optical fibers, which are arrayed in the array guide grooves, thereby causing the problems to be solved.

Furthermore, the third aspect of a multiple-core optical connector according to the invention is constructed, in addition to the construction of the first aspect of the invention, so that the rear end side of the pressing member is provided with roundness for lightening the fitting of optical fibers at the pressed side of the optical fibers, thereby causing the problems to be solved.

Furthermore, the fourth aspect of a multiple-core optical connector according to the invention is constructed, in addition to the construction of the first aspect, so that the pressing member is formed by juxtaposing two or more pressing member pieces in a direction of arraying the optical fibers, thereby causing the problems to be solved.

Furthermore, the fifth aspect of a multiple-core optical connector according to the invention is constructed, in addition to the construction of the first aspect of the invention, so that array guide grooves are formed at the central area of a flat substrate of the optical fiber arraying member, which is made lower than the upper surface of the flat substrate thereof, and the inclined surface, on which the corresponding array guide grooves are formed, at both outer ends of the abovementioned array guide grooves are elongated so as to reach the upper surface of the flat substrate, wherein the upper surface of the flat substrate is made roughly coincident with the upper end of the first and second optical fibers arrayed in the array guide grooves, and the upper surface of the corresponding flat substrate and the upper ends of the first and second optical fibers are covered by a pressing member with almost no clearance, thereby causing the problems to be solved.

Furthermore, the sixth aspect of a multiple-core optical connector according to the invention is constructed, in addition to any one of the first through the fifth aspects of the invention, so that a tapered surface is formed at the rear end side of the flat substrate of the optical fiber arraying member in a direction of thinning the thickness of the corresponding flat substrate, thereby causing the problems to be solved.

Furthermore, the seventh aspect of a multiple-core optical connector according to the invention is constructed, in addition to any one of the first through the fifth aspects of the invention, so that a plurality of pairs of fiber tapes in which the first optical fiber tape and the second optical fiber tape are disposed overlapping each other are juxtaposed in a direction of arraying optical fibers, and at least one of the sides of the first and second optical fiber tapes of these pairs of fiber tapes, which are adjacent to the other pairs of fiber tapes, is cut off, thereby causing the problems to be solved.

Furthermore, the eighth aspect of a multiple-core optical connector according to the invention is constructed, in addition to any one of the first through the fifth aspects of the invention, so that the first and second optical fiber tapes are respectively branched at the terminal side of the incident and outgoing ends, thereby causing the problems to be solved.

Still furthermore, the ninth aspect of a multiple-core optical connector according to the invention is constructed, in addition to any one of the first through the fifth aspects of the invention, so that the terminal sides of optical fiber tapes composed by juxtaposing a plurality of optical fibers to be band-like are divided into two, wherein one of the two-divided optical fiber tapes is made into the first optical fiber tape while the other side is made into the second optical fiber tape, optical fibers juxtaposed in the first optical fiber tape are made into the first optical fibers, and optical fibers juxtaposed in the second optical fiber tape are made into the second optical fibers, thereby causing the problems to be solved.

Furthermore, the first aspect of a manufacturing method of multiple-core optical connector according to the invention is a manufacturing method of multiple-core optical connector having any one of the constructions according to the first through the ninth aspects of the invention with respect to the abovementioned multiple-core optical connector, wherein the coatings halfway of the first and second optical fiber tapes are removed, thereafter the first and second optical fibers, the coating of which are eliminated, are array-converted so as to be alternately arrayed in array guide grooves of an optical fiber arraying member, thereafter a pressing member is provided on the upper surface of the optical fibers to cause the respective optical fibers to be pressed, placed and fixed in the abovementioned array guide grooves, and two multiple-core connectors are produced at one time by dividing and cutting the fixing part of the abovementioned pressing member and the optical fiber arraying member, thereby causing the problems to be solved.

Furthermore, the second aspect of a manufacturing method of multiple-core optical connector according to the invention is a manufacturing method of multiple-core optical connector having any one of the constructions according to the first through the ninth aspects of the invention with respect to the abovementioned multiple-core optical connector, wherein optical fibers of any one of the first and second optical fiber tapes, the coating of which are removed, are temporarily fixed in a plurality of guide grooves of the optical fiber arraying members in a state where they are placed every other groove, and thereafter optical fibers of the other one of the abovementioned first and second optical fiber tapes, the coating of which are removed, are arrayed every other groove in the array guide grooves remaining every other groove, thereby causing the problems to be solved.

Furthermore, the third aspect of a manufacturing method of multiple-core optical connector according to the invention is a manufacturing method of multiple-core optical connector having any one of the constructions according to the first through the eighth aspects of the invention with respect to the abovementioned multiple-core optical connector, wherein optical fibers are pressed by a pressing member in a state where the optical fibers of any one of the first and second optical fiber tapes, the coatings of which are removed, are arrayed every other groove in a plurality of array guide grooves of the optical fiber arraying member, and thereafter the optical fibers of the other one of the first and second optical fiber tapes, the coatings of which are removed, are inserted from the upper side or the lower side of the optical fibers pressed by the abovementioned pressing member into the clearance formed by the pressing member and the array guide grooves remaining every other groove, thereby causing the problems to be solved.

Furthermore, the fourth aspect of a manufacturing method of multiple-core optical connector according to the invention is constructed, in addition to the constructions of the second and third aspects of a manufacturing method of multiple-core optical connector, so that when peeling off the coatings of the first and second optical fiber tapes, a part of the coatings of at least one of the abovementioned optical fiber tapes is not removed and is caused to slide toward the tip end side of optical fibers in order to leave the coating at the tip end side of the optical fibers as a remaining coating, and thereafter the root side of the optical fibers, the coatings of which are removed, is arrayed in the optical fiber arraying member, thereby causing the problems to be solved.

Furthermore, the fifth aspect of a manufacturing method of multiple-core optical connector according to the invention is constructed, in addition to the construction of the fourth aspect of a manufacturing method of multiple-core optical connector, so that a plurality of optical fiber tapes, a part of the coatings of which are left over, are prepared and juxtaposed in a direction of arraying optical fibers, and they are disposed with the position of the remaining coatings of the adjacent optical fiber tapes in its lengthwise direction of optical fibers slid, and thereafter the optical fibers are arrayed in the optical fiber arraying member, thereby causing the problems to be solved.

Furthermore, the sixth aspect of a manufacturing method of multiple-core optical connector according to the invention is a manufacturing method of multiple-core optical connector having any one of the constructions according to the first through the ninth aspects of the invention with respect to the abovementioned multiple-core optical connector, wherein after the optical fibers arrayed in the array guide grooves of the optical fiber arraying member are pressed by a pressing member, an adhesive agent is supplied to the connection end face side of the corresponding optical fibers to cause the optical fibers to be fixed in the array guide grooves, thereby causing the problems to be solved.

Furthermore, the seventh aspect of a manufacturing method of multiple-core optical connector according to the invention is a manufacturing method of multiple-core optical connector having any one of the constructions according to the first through the ninth aspects of the invention with respect to the abovementioned multiple-core optical connector, wherein optical fiber tapes composed by juxtaposing a plurality of optical fibers to be band-like are divided into two, and one of the two-divided optical fiber tapes is made into the first optical fiber tape while the other optical fiber tape is made into the second optical fiber tape, thereby causing the problems to be solved.

With the invention constructed as described above, when assembling a multiple-core optical connector, the first optical fiber tape and the second optical fiber tape are disposed to overlap each other, the first and second optical fibers for which the coatings of the respective optical fiber tapes at the tip end side are removed are array-converted so as to be alternately disposed, and inserted into and disposed in the array guide grooves on a flat substrate which is an optical fiber arraying member, wherein a pressing member is disposed on the upper side of the respective optical fibers at the tip end side where the corresponding optical fibers are arrayed, and the pressing member is pressed onto and fixed at the flat substrate in order to place and fix the respective optical fibers in the array guide grooves, whereby the object multiple-core optical connector can be produced.

With the invention, since the first and second optical fibers are accommodated in the array guide grooves formed on a flat substrate, it is possible to see the states of the optical fibers arrayed in the array guide grooves at a glance from the outside, whereby it is possible to array-convert the first optical fibers and the second optical fibers so that no error arises in the array and to easily array and accommodate them correctly in the corresponding array guide grooves. Therefore, the assembling efficiency of multiple-core optical connectors can be increased, and it is possible to remarkably decrease the assembling cost of multiple-core optical connectors.

Furthermore, with the second aspect of a multiple-core optical connector according to the invention, since a filter is attached to at least one of the first optical fibers and the second optical fibers, which are arrayed in the array guide grooves, a feature equivalent to a case where a filter is installed in an optical waveguide of waveguide component can be obtained by connecting the multiple-core optical connector according to the second aspect to the waveguide component. Providing a filter on a flat substrate of an inexpensive optical fiber arraying member rather than providing the same on an expensive at the side of an expensive waveguide substrate contributes to a lowering of the production cost with respect to the yield in a filter attaching process.

According to the invention, since the arraying pitch of array guide grooves formed on a flat substrate which is an optical fiber arraying member is formed to be roughly coincident with the outer diameter of the respective optical fibers, the coatings of which are removed, the width of an arraying area of optical fibers can be made very small in comparison with a conventional multiple-core optical connector. Therefore, even though the number of cores of optical fibers to be arrayed is increased, it is possible to form a small-sized multiple-core optical connector.

Furthermore, since the first optical fibers for which the coatings of the optical fiber tape are removed, and the second optical fibers for which the coatings of the second optical tape are removed, both being disposed so as to overlap each other, are array-converted to be alternately arrayed, it is possible to take out both light incident from the first optical fibers and light incident from the second optical fibers from the tip end side (connection end face side) in a state where they are alternately juxtaposed. Therefore, for example, in a case where a multiple-core optical connector according to the invention is connected to a waveguide element composed by juxtaposing a plurality of waveguides, light coming from the first optical fibers is made incident into optical waveguides of odd numbers, and light coming from the second optical fibers is made incident into optical waveguides of even numbers, that is, the light from the first optical fibers and that from the second optical fibers can alternately be made incident into optical waveguides of a waveguide element in the arraying order.

Furthermore, in a case where different light (for example, different light with respect to wavelength and power level) is alternately caused to outgo from the respective optical waveguides of the abovementioned waveguide element in the arraying order of optical waveguides and a multiple-core optical connector according to the invention is connected to the waveguide element, different light alternately caused to outgo from the respective optical waveguides of the abovementioned waveguide element is shared to the first optical fibers and the second optical fibers every light of the common kind and is made incident thereinto, wherein it is possible to pick up every light of the same kind after the same is grouped, separately from the first optical fiber tape and the second optical fiber tape.

Therefore, it becomes possible to make different light alternately incident into each of a plurality of optical lines (optical waveguides, etc.) in the arraying order of the optical lines, and to classify, group by group, different light alternately caused to outgo from each of a plurality of optical lines and to collectively pick up the same from the first optical fiber tape and the second optical fiber tape. Accordingly, it is possible to construct an optical communication system having excellent features.

Furthermore, with the invention, since the first optical fibers and the second optical fibers are arrayed and accommodated in array guide grooves arrayed and formed on a flat substrate, it is possible to observe the states of optical fibers accommodated in the array guide grooves from outside. Thereby, a work of accommodating the first optical fibers and the second optical fibers in the abovementioned array guide grooves is made remarkably easy, and it is possible to remarkably increase the efficiency of assembling multiple-core optical connectors. In line therewith, the production cost of the multiple-core optical connector can be remarkably decreased.

Furthermore, since the arraying state of optical fibers accommodated in the array guide grooves can be checked at a glance, it is possible to immediately correct any error should the same arise in the array of optical fibers. Since any mistake of alternate array of the first optical fibers and the second optical fibers can be eliminated, it is possible to sufficiently increase the reliability of multiple-core optical connectors according to the invention. In particular, in a case where the flat substrate and pressing member are formed of transparent material, especially if at least the pressing member is made transparent, the arraying state of optical fibers can be seen from the rear side of the flat substrate, and the arraying state of optical fibers pressed by the pressing member can be checked from the outside. Therefore, it is possible to thoroughly eliminate any error in the array of optical fibers, whereby the reliability of multiple-core optical connectors can be further increased.

Furthermore, with the second aspect of a multiple-core optical connector according to the invention, in which a filter is attached to at least one of the first optical fibers and the second optical fibers accommodated and arrayed in the array guide grooves on a flat substrate, providing a filter at the side of multiple-core optical connector remarkably contributes to a lowering of the production cost, in view of taking the yield of production into consideration, in comparison with a case where the filter is provided in an optical waveguide of optical waveguide components. Furthermore, an excellent effect can be obtained, by which the total production cost of connector products in which a multiple-core optical connector is integrally connected to optical waveguide components can be remarkably decreased in comparison with a case where a filter is provided at the optical waveguide component side.

Furthermore, with the third aspect of a multiple-core optical connector according to the invention, in which a roundness for lightening the fitting of optical fibers to the fiber pressing plane is formed at the rear end side of a pressing member, since it is possible to prevent any excessive force directly given from the pressing member to the optical fibers, breakage and/or interruption of optical fibers resulting from an excessive force can be prevented from occurring, the production yield of multiple-core optical connectors can be increased, resulting in a decrease of the production cost.

Furthermore, with the fourth aspect of a multiple-core optical connector according to the invention, in which a pressing member is formed by juxtaposing two or more pressing member pieces in the direction of arraying optical fibers, the number of cores of optical fibers to be arrayed in a multiple-core optical connector can be increased, and even though the area of the pressing member is increased, it is possible to prevent the pressing members from being cracked due to thermal contraction, etc. in line with temperature changes, whereby the production yield of multiple-core optical connectors can be increased along with improvement of the long-term reliability of multiple-core optical connectors.

Furthermore, with the fifth aspect of a multiple-core optical connector according to the invention, in which array guide grooves of optical fibers are formed at the central area of a flat substrate, which is made lower than the upper surface of the flat substrate, on the flat substrate of an optical fiber arraying member, and a groove-formed inclined surface at both outer ends of the corresponding array guide grooves is elongated so as to reach the upper surface of the flat substrate, wherein the upper surface of the flat substrate is roughly coincident with the upper end of the first and second optical fibers arrayed in the array guide grooves and the upper surface of the flat substrate and the upper ends of the first and second optical fibers are covered by a pressing member with almost no clearance, if, for example, an adhesive agent is supplied between the optical fiber arraying member, the first, second optical fibers and the pressing member and the first and second optical fibers are fixed in the array guide grooves of the optical fiber arraying member, the adhesive agent is not allowed to enter between the upper surface of the flat substrate of the optical fiber arraying member and the pressing member, but the same may be adhered to only the clearance between the array guide grooves, the first and second optical fibers, and the pressing member.

Therefore, with the fifth aspect, differing from a case where a clearance is formed between the upper surface of a flat substrate and the bottom of a pressing member, the optical fibers arrayed at both outer ends of the array guide grooves can be prevented, due to the adhesive agent being entered into the clearance, from being pulled due to hardening of the adhesive agent and/or thermal contraction of the adhesive agent in line with temperature changes. It is possible to increase the production yield of multiple-core optical connectors and produce multiple-core optical connectors of high long-term reliability.

Furthermore, with the sixth aspect of a multiple-core optical connector according to the invention, in which a tapered surface is formed at the rear end side of flat substrate of an optical fiber arraying member in a direction of thinning the thickness of the corresponding flat substrate, since an upward bend from the optical fiber arraying member of optical fibers, for which the coatings at the tip end side of the upside optical fiber tape of the first and second optical fiber tapes are removed, toward the tip end side of the coatings of the optical fiber tape, and a downward bend from the optical fiber arraying member of optical fibers, for which the coatings of the downside optical fiber tape are removed, toward the tip end side of the coatings of the optical fiber tape can be made uniform. Therefore, it is possible to prevent optical fibers from being interrupted by an excessive force given from the pressing member to the optical fibers. For this reason, the production yield of multiple-core optical connectors can be increased, resulting in a lowering of the production cost of the multiple-core optical connectors.

Furthermore, with the seventh aspect of a multiple-core optical connector according to the invention, in which a plurality of pairs of fiber tape consisting of the first optical fiber tape and second optical fiber tape which are disposed so as to overlap each other are juxtaposed in the direction of arraying optical fibers and at least one of the sides where the first and second optical fiber tapes of the plurality of pairs of fiber tapes are made adjacent to the other pair of fiber tapes is cut off, it is possible to prevent that the coatings at the sides at which pairs of fiber tapes juxtaposed in plurality are made adjacent to the other pair of fiber tapes will become an obstacle, whereby it is possible to juxtapose pairs of fiber tapes in high concentration, and when optical fibers of the respective optical fiber tapes are arrayed in an optical fiber arraying member, it is possible to array optical fibers in the array guide grooves of an optical fiber arraying member without being remarkably bent at the outer ends of tapes. Therefore, multiple-core optical connectors can be made small-sized, and the production yield thereof can be improved, resulting in a lowering of the production cost of multiple-core optical connectors.

Furthermore, with the eighth aspect of a multiple-core optical connector according to the invention, in which the first and second optical fiber tapes are branched at the terminal side at the outgoing ends thereof, For example, a multiple-core optical connector is produced by using the first and second optical fiber tapes having a number of cores,, and the terminal sides thereof are branched corresponding to the needs (corresponding to the necessary number of terminals) at the incident and outgoing ends, whereby since it is possible to very efficiently produce multiple-core optical connectors corresponding to the number of terminals at the incident and outgoing ends of signals, they can correspond to the number of terminals at the incident and outgoing ends and their production cost can be further decreased while still having excellent features.

Still furthermore, with the ninth aspect of a multiple optical connector according to the invention, in which optical fiber tapes composed by juxtaposing a plurality of optical fibers to be band-like are divided into two, wherein one of the two-divided optical fiber tapes is made into the first optical fiber tape while the other side is made into the second optical fiber tape, optical fibers juxtaposed in the first optical fiber tape are made into the first optical fibers, and optical fibers juxtaposed in the second optical fiber tape are made into the second optical fibers, when using a multiple-core optical connector with the same connected to, for example, a 1×n star coupler, etc., an optical fiber tape formed by juxtaposing "n" optical fibers is divided into two to make them into the first and second optical fiber tapes, and the first optical fibers juxtaposed in the first optical fiber tape and the second optical fibers juxtaposed in the second optical fiber tape are alternately array-converted and connected to "n" terminals at the outgoing end side of the 1×n star coupler. Thereby, it is possible to pick up each light made incident into and branched in the 1×n star coupler from one optical fiber tape by using a multiple-core optical connector according to the invention, which is very small-sized in comparison with a conventional multiple-core optical connector formed by juxtaposing "n" optical fibers.

Furthermore, with the first aspect of a manufacturing method of multiple-core optical connectors according to the invention is a manufacturing method of multiple-core optical connector having any one of the abovementioned constructions, wherein the coatings halfway of the first and second optical fiber tapes are removed, thereafter the first and second optical fibers, the coating of which are eliminated, are array-converted so as to be alternately arrayed in array guide grooves of an optical fiber arraying member, thereafter a pressing member is provided on the upper surface of the optical fibers to cause the respective optical fibers to be pressed, placed and fixed in the abovementioned array guide grooves, and two multiple-core connectors are produced at one time by dividing and cutting the fixing part of the abovementioned pressing member and the optical fiber arraying member, two multiple-core optical connectors can be produced at one time, it is possible to very efficiently produce multiple-cores optical connectors, resulting in a lowering of the production cost thereof.

Furthermore, the second aspect of a manufacturing method of multiple-core optical connectors according to the invention is a manufacturing method of multiple-core optical connector having any one of the abovementioned constructions, wherein optical fibers of any one of the first and second optical fiber tapes, the coatings of which are removed, are temporarily fixed in a plurality of guide grooves of the optical fiber arraying members in a state where they are placed every other groove, and thereafter optical fibers of the other one of the abovementioned first and second optical fiber tapes, the coatings of which are removed, are arrayed every other groove in the array guide grooves remaining every other groove, and with the third aspect of a manufacturing method of multiple-core optical connector according to the invention is a manufacturing method of multiple-core optical connector having any one of the constructions wherein optical fibers are pressed by a pressing member in a state where the optical fibers of any one of the first and second optical fiber tapes, the coatings of which are removed, are arrayed every other groove in a plurality of array guide grooves of the optical fiber arraying member, and thereafter the optical fibers of the other one of the first and second optical fiber tapes, the coatings of which are removed, are inserted from the upper side or the lower side of the optical fibers pressed by the abovementioned pressing member into the clearance formed by the pressing member and the array guide grooves remaining every other groove, arraying of the first and second optical fibers in the array guide grooves can be very easily carried out, and the optical fibers which are firstly arrayed every other groove in the array guide grooves can be prevented from coming off from the array guide grooves. Therefore, multiple-core optical connectors can be very easily produced, and the production yield of multiple-core optical connectors can be improved, resulting in a lowering of the production cost thereof.

Furthermore, with the fourth aspect of a manufacturing method of multiple-core optical connectors according to the invention, in which when peeling off the coatings of the first and second optical fiber tapes, a part of the coatings of at least one of the abovementioned optical fiber tapes is not removed and is caused to slide toward the tip end side of optical fibers in order to leave the coating at the tip end side of the optical fibers as a remaining coating, and thereafter the root side of the optical fibers, the coatings of which are removed, is arrayed in the optical fiber arraying member, since the optical fibers for which the coatings at the tip end side of the first and second optical fiber tapes are removed can be prevented by the remaining coatings from radially extending, it is possible to easily array optical fibers in an optical fiber arraying member, resulting in an efficient production of multiple-core optical connectors.

Furthermore, with the fifth aspect of a manufacturing method of multiple-core optical connectors according to the invention, in which a plurality of optical fiber tapes, a part of the coatings of which is left over, are prepared and juxtaposed in a direction of arraying optical fibers, and they are disposed with the position of the remaining coatings of the adjacent optical fiber tapes in its lengthwise direction of optical fibers slid, and thereafter the optical fibers are arrayed in the optical fiber arraying member, when multiple-core optical connectors are produced in a state where a plurality of optical fibers tapes having the coatings partially remained are prepared, it is possible to prevent the remaining coatings of the adjacent optical fiber tapes from being brought into collision with each other. Therefore, the array of optical fibers in an optical fiber arraying member can be easily carried out, resulting in easy production of multiple-core optical connectors.

Furthermore, with the sixth aspect of a manufacturing method of multiple-core optical connector according to the invention is a manufacturing method of multiple-core optical connector having any one of the abovementioned constructions wherein after the optical fibers arrayed in the array guide grooves of the optical fiber arraying member are pressed by a pressing member, an adhesive agent is supplied to the connection end face side of the corresponding optical fibers to cause the optical fibers to be fixed in the array guide grooves, since any missing of the adhesive agent and/or mixing of air bubbles thereof can be prevented from occurring between the array guide grooves of the optical fiber arraying member, optical fibers, and pressing members at the connection end face side of optical fibers, it is possible to prevent that the connection loss with the other optical components of multiple-core optical connectors is generated due to missing of the adhesive agent and or air bubbles thereof and that the optical fibers are given load due to expansion in line with thermal changes of air bubbles. Therefore, it is possible to connect multiple-core optical connectors to the other optical components at a low connection loss, and it is possible to produce multiple-core optical connectors having excellent long-term reliability.

Furthermore, with the seventh aspect of a manufacturing method of multiple-core optical connector according to the invention is a manufacturing method of multiple-core optical connectors having any one of the abovementioned constructions, wherein optical fiber tapes composed by juxtaposing a plurality of optical fibers to be band-like are divided into two, and one of the two-divided optical fiber tapes is made into the first optical fiber tape while the other optical fiber tape is made into the second optical fiber tape, it is possible to produce multiple-core optical connectors having an effect of the ninth aspect of the invention.

BRIEF DESCRIPTION OF THE DRAWINGS

FIG. 10 is a view showing an adhesive agent supplying process in production of multiple-core optical connectors according to the abovementioned second preferred embodiment, wherein (a) thereof is a perspective view, and (b) thereof is a side elevational view.

BEST MODE FOR CARRYING OUT THE INVENTION

A detailed description is given of the invention with reference to the accompanying drawings. Hereinafter, the components which are identical to those in the conventional example are given the same reference number, and the overlapping description thereof is omitted herein.

Figure 1:
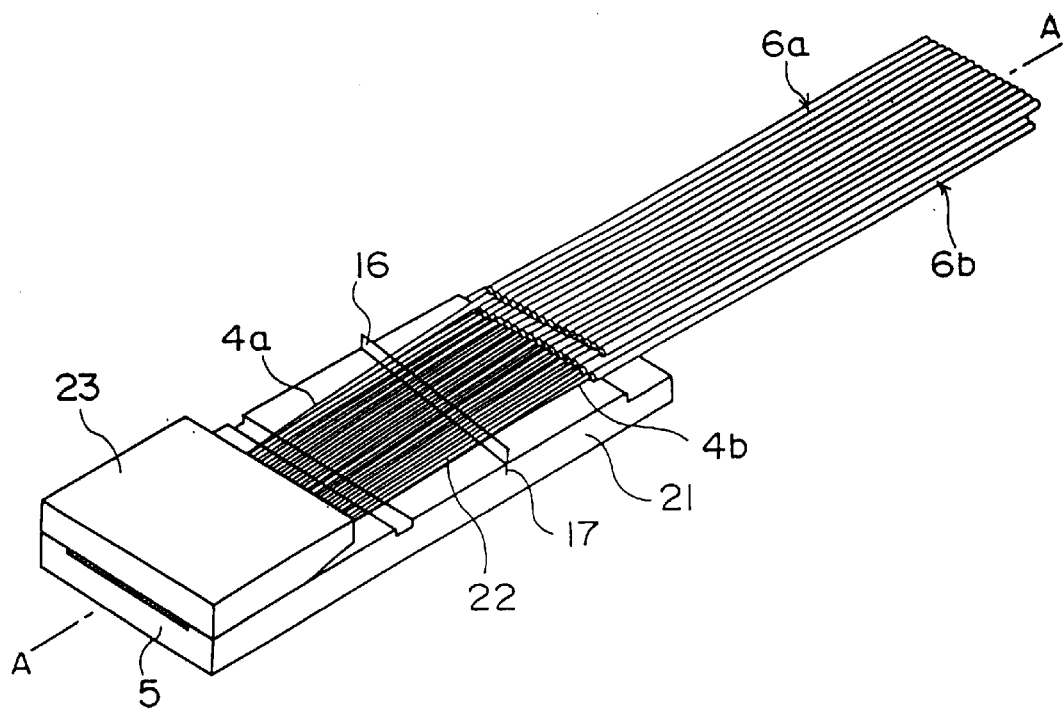
FIG. 1 is a perspective view showing a first preferred embodiment of multiple-core optical connectors according to the invention.
Figure 2:
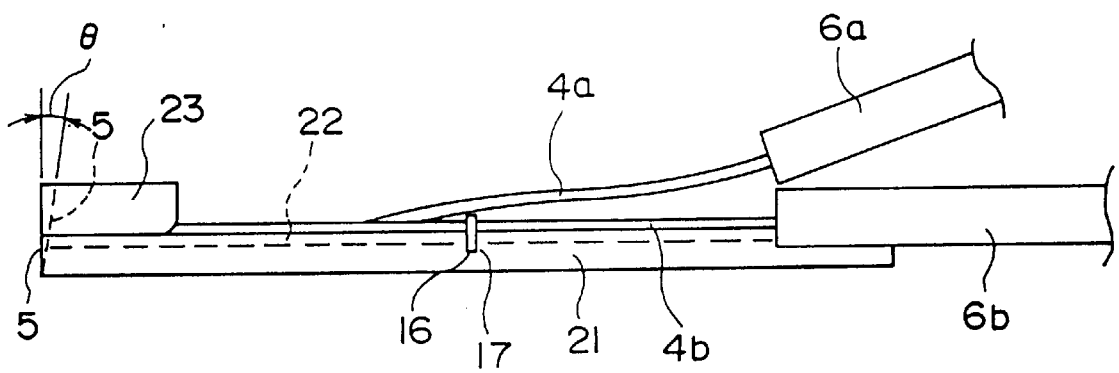
FIG. 2 is a cross-sectional view taken along the line A—A in FIG. 1.

FIG. 1 shows a perspective view of a first preferred embodiment of a multiple-core optical connector according to the present invention, and FIG. 2 is a cross-sectional view taken along the line A—A in FIG. 1. In these drawings, a plurality of array guide grooves 22 are juxtaposed and arrayed in the width direction on a flat substrate 21 which is an optical arraying member. Although the abovementioned flat substrate 21 may be made of a non-transparent material, in the preferred embodiment, the same is made of glass known as the tradename "Pylex", or transparent glass substrate of synthetic quartz, etc., wherein on the transparent flat substrate 21, a plurality of array guide grooves 22 are formed by, for example, machining, and extending in the lengthwise direction of the flat substrate 21, at a pitch of, for example, 127 µm, which is roughly equivalent to the outer diameter of bare optical fibers 4 (4a, 4b) from which their coatings are removed.

Figure 3:
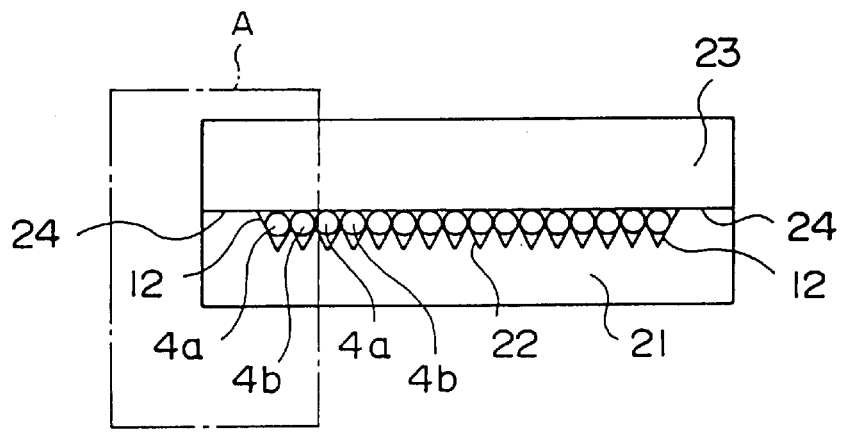
FIG. 3 is a front elevational view showing a multiple-core optical connector of the abovementioned preferred embodiment.
Figure 4:
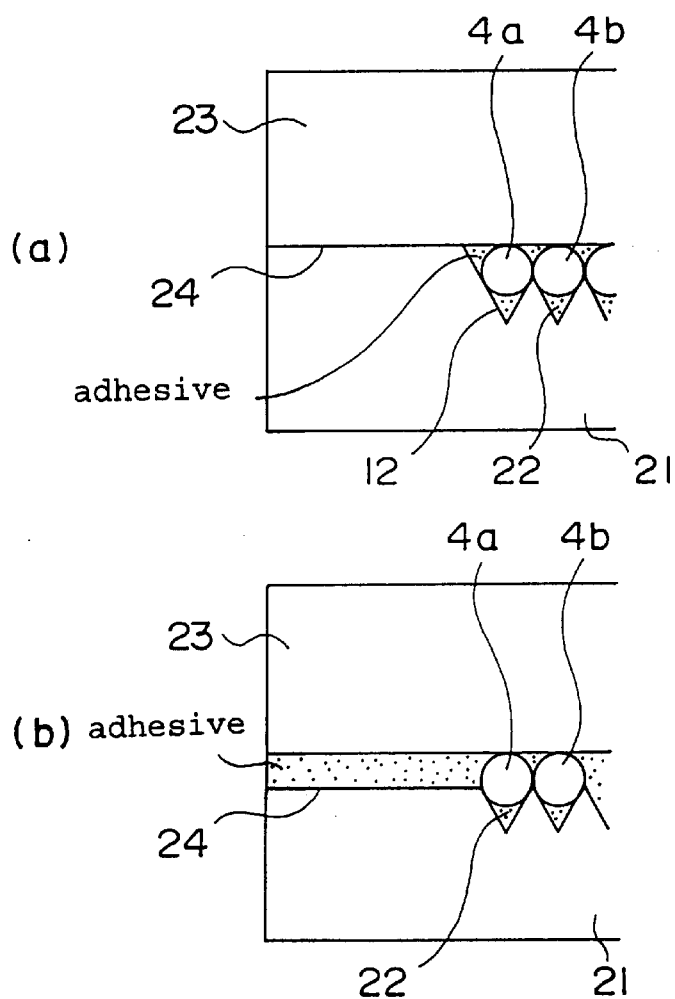
FIG. 4 is an explanatory view showing an enlarged view (a) of a frame A indicated with an alternate long and short dash line, in comparison with a part (b) of the front elevational view of a multiple-core optical connector in which a clearance is formed between the bottom of a pressing member 23 and the upper surface 24 of a flat substrate 21.

Furthermore, the shape of the array guide grooves 22 is favorably V-shaped or U-shaped as shown in, for example, FIG. 3. The array guide grooves 22 are formed at the central area of the flat substrate 21 which is made lower than the upper surface 24 of the flat substrate 21, and in the preferred embodiment, as shown in FIG. 3 and FIG. 4(a), the groove-formed inclined surface at both ends of the array guide grooves 22 is caused to reach the upper surface 24 of the flat substrate 21. Furthermore, as shown in FIG. 1, a filter insertion groove 17 for inserting a filter is formed at an area, where the array guide grooves 22 are formed, in the crossing direction of the corresponding array guide grooves 22.

Figure 22:
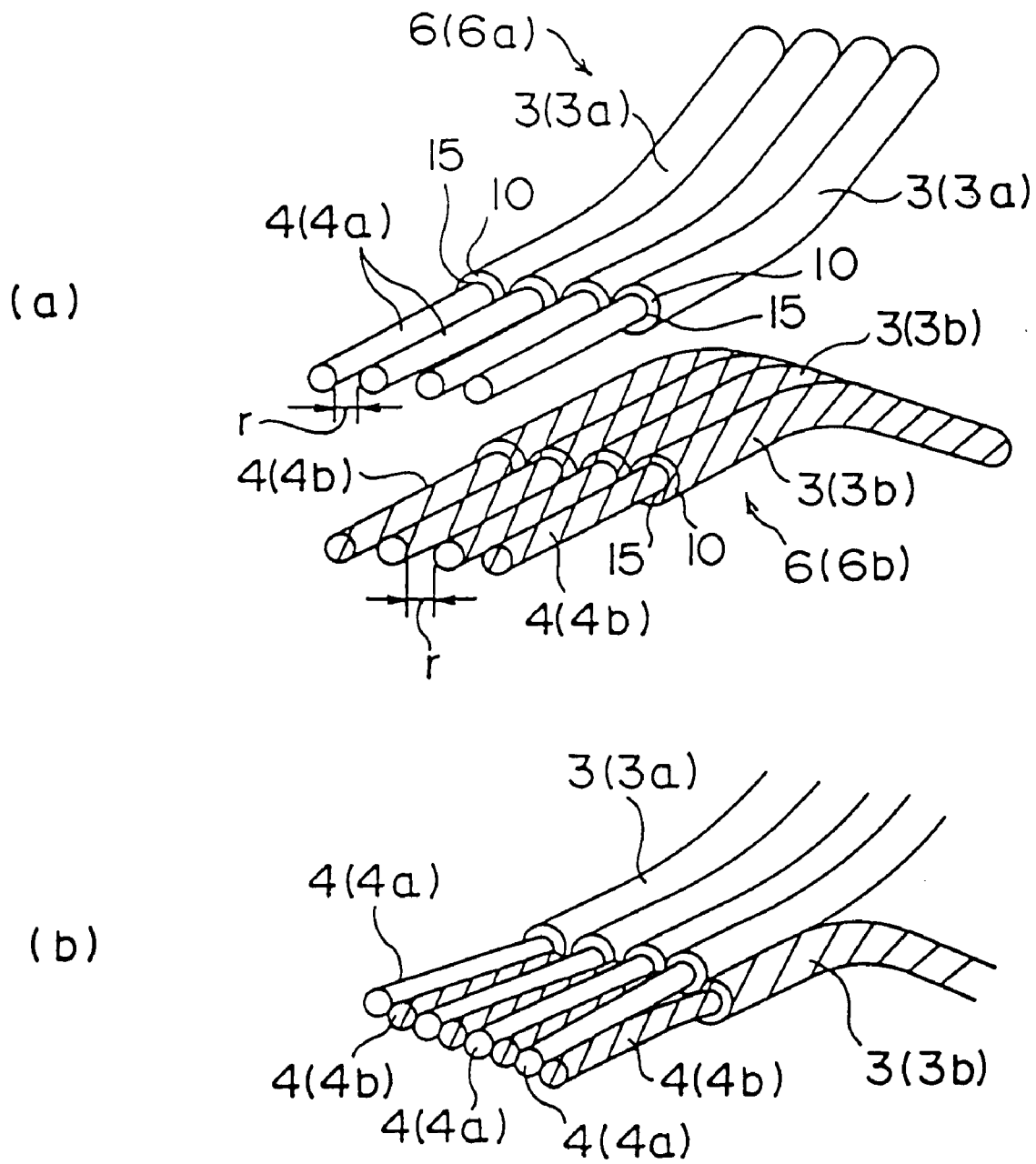
FIGS. 22(a)–(b) is a view showing an overlapping state of the first optical fiber tape 6a and the second optical fiber tape 6b and a state of array-conversion of the first bare optical fibers 4a of the first optical fiber tape side and the second bare optical fibers 4b of the second optical fiber tape side, the coatings of which are removed the tip end.

The first optical fiber tape 6a consisting of, for example, 16 cores and formed by juxtaposing a plurality of optical fibers to be band-like, and the second optical fiber tape 6b consisting of 16 cores and formed by juxtaposing the second optical fibers to be band-like are disposed to overlap each other at the rear end side of the abovementioned flat substrate 21, wherein the first bare optical fibers 4a for which the coatings at the tip end side of the first optical fiber tape 6a are removed, and the second bare optical fibers 4b for which the coatings at the tip end side of the second optical fiber tape 6b are removed are array-converted one by one as shown in FIG. 22 and are alternately accommodated in the corresponding array guide grooves 22, and the upper ends of the first and second bare optical fibers 4a, 4b are roughly coincident with the upper surface 24 of the flat substrate 21.

Furthermore, a plate-like pressing member 23 is disposed at the tip end side position of the flat substrate 21 from the upper side of the disposed bare optical fibers 4a, 4b in a state where these bare optical fibers 4a, 4b are arrayed and accommodated, wherein the upper surface 24 of the flat substrate 21 and the upper sides of the first and second bare optical fibers 4a, 4b are covered by the pressing member 23 with almost no clearance and the first and second optical fibers 4a, 4b are pressed by the pressing member 23, thereby the tip end sides of the first and second optical fibers 4a, 4b are placed and fixed in the array guide grooves 22.

A rectangular plate-like filter 16 is inserted into the abovementioned filter insertion groove 17, and the filter 16 is attached to the respective second bare optical fibers 4b at the second optical fiber tape 6b side. Furthermore, the filter 16 is fixed with, for example, a thermohardening adhesive agent in the filter insertion groove 17, and the flat substrate 21 and the pressing member 23 are also adhered to each and fixed with a thermohardening adhesive agent, etc. Although the abovementioned pressing member 23 may be formed by a non-transparent material, in this preferred embodiment, the same is made of a transparent material such as, for example, glass plate, etc. as in the flat substrate 21.

Next, a brief description is given of a manufacturing method of multiple-core optical connector according to the preferred embodiment. Firstly, the second optical fiber tape 6b in which bare optical fibers 4b are exposed by removing the coatings at the tip end thereof are fed from the rear end side of the flat substrate 21, and the bare optical fibers 4b are placed and accommodated every other groove in the array guide grooves 22 on the flat substrate 21, wherein a portion at which the filter insertion groove 17 is provided is temporarily set using an adhesive agent, etc. In this preferred embodiment, it is designed that the filter insertion groove 17 is provided at a formation area of the array guide grooves 22, avoiding the place where the pressing member 23 is secured (that is, roughly the middle position of the array guide grooves 22 in its lengthwise direction).

Next, the filter insertion groove 17 is formed at the position, where the second bare optical fibers 4b are temporarily set, in the crossing direction of the respective second bare optical fibers 4b, and next a rectangular plate-like filter 16 is inserted into the filter insertion groove 17, whereby the filter 16 and the flat substrate 21 are fixed with a thermohardening type adhesive agent, etc. in the filter insertion groove 17. By attaching this filter 16, the filter 16 will be attached to the respective bare optical fibers 4b of the second optical fiber tape 6b.

Next, the first optical fiber tape 6a having the coatings removed at its tip end side is overlapped on the upper side of the abovementioned second optical fiber tape 6b, and the respective first bare optical fibers 4a of the first optical fiber tape 6a are accommodated in the array guide grooves 22 forward of the filter (that is, in the array guide grooves which are empty with no second bare optical fibers 4b accommodated) adjacent to the grooves in which the second bare optical fibers are accommodated, passing through the upper side of the abovementioned filter 16. Thereby, the first bare optical fibers 4a and the second bare optical fibers 4b are alternately array-converted adjacent to each other and accommodated in the respective array guide grooves 22 forward of the flat substrate 21.

Next, the pressing member 23 is pressed from the upper side of the bare optical fibers 4a, 4b to the tip end side, and the flat substrate 21 and pressing member 23 are fixed with a thermohardening type adhesive agent, etc. Thereby, a plurality of the arrayed first bare optical fibers 4a and the second arrayed bare optical fibers 4b are placed in and fixed in the array guide grooves 22. Next, an adhesive agent is coated onto the upper side of the bare optical fibers 4a, 4b exposed to the flat substrate 21 and the bare optical fibers 4a, 4b are buried in the adhesive agent in order to protect the same from external forces as necessary. Finally, the connection end face 5 at the tip end side of the flat substrate 21 are ground along with the end faces of the pressing member 23 and bare optical fibers 4a, 4b, thereby causing the object multiple-core optical connectors to be produced.

With the multiple-core optical connectors according to the preferred embodiment, since the bare optical fibers 4a, 4b are accommodated in the array guide grooves 22 formed at a pitch which is roughly coincident with the outer diameter of the bare optical fibers 4a, 4b, it is possible to achieve a remarkable downsizing of multiple-core optical connectors, as in a case of multiple-core optical connectors previously proposed by the present applicant, in comparison with the conventional examples, and simultaneously since the first bare optical fibers 4a and the second bare optical fibers 4b are alternately array-converted and accommodated in the array guide grooves 22, light of, for example, wavelength $\lambda 1$ passing through the first bare optical fibers 4a and light of, for example, wavelength $\lambda 2$, passing through the second bare optical fibers 4b can be alternately array-converted and made incident into an optical waveguide, etc. connected to a multiple-core optical connector, wherein alternately arrayed light of wavelengths $\lambda 1$ and $\lambda 2$ which are supplied from an optical waveguide, etc. can be picked up while light of wavelength $\lambda 1$ can be collectively picked up by the first optical fiber tape and light of wavelength $\lambda 2$ can be collectively picked up by the second optical fiber tape. That is, the effects which are similar to those of a multiple-core optical connector previously filed by the present applicant can be obtained.

Furthermore, since a multiple-core optical connector according to the preferred embodiment is constructed so that optical fibers are accommodated in array guide grooves 22 arrayed and formed on a flat substrate 21, a state of the bare optical fibers 4a, 4b accommodated in the respective array guide grooves 22 can be checked from the outside at a glance, whereby it becomes possible to easily accommodate the first bare optical fibers 4a and second bare optical fibers 4b correctly in the respective array guide grooves 22 without any mistake, and the work of assembling multiple-core optical connectors can be remarkably improved, resulting in a lowering of the assembling cost along with eliminating any erroneous array of bare optical fibers 4a, 4b. Therefore, the reliability of multiple optical connectors can be further increased. In particular, in the preferred embodiment, since both flat substrate 21 and pressing member 23 are formed of transparent materials, it is possible to observe the arrayed state of the bare optical fibers 4a, 4b from the underside (the side opposite the formation side of the array guide grooves 22) of the flat substrate 21, and possible to observe the arrayed states of the bare optical fibers 4a, 4b pressed by the pressing member 23 from the outside. Therefore, any erroneous array of bare optical fibers 4a, 4b can be completely eliminated.

Figure 23:
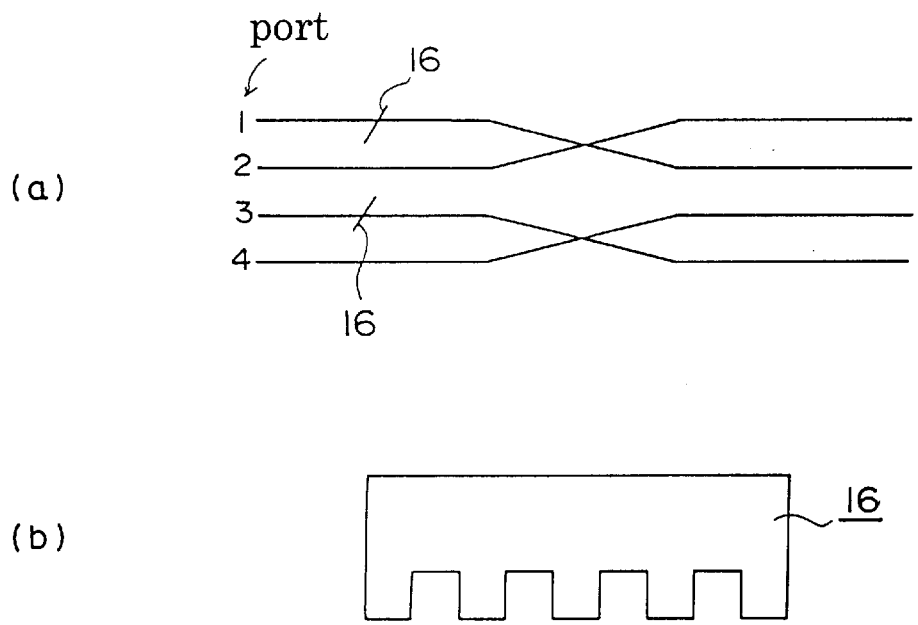
FIGS. 23(a)–(b) is a view showing an array formation pattern of a waveguide with a 2×2 optical coupler type filter, which is formed on a waveguide substrate of an optical waveguide component and showing the shape of the filter.
Figure 24:
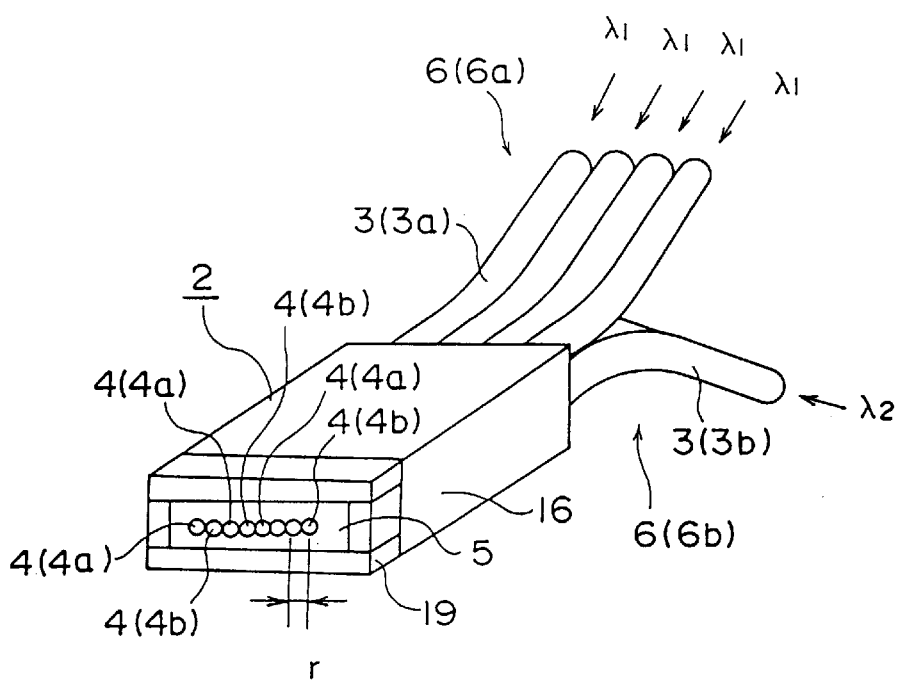
FIG. 24 is a perspective view of a multiple-core optical connector according to a patent application previously filed by the present applicant.
Figure 25:
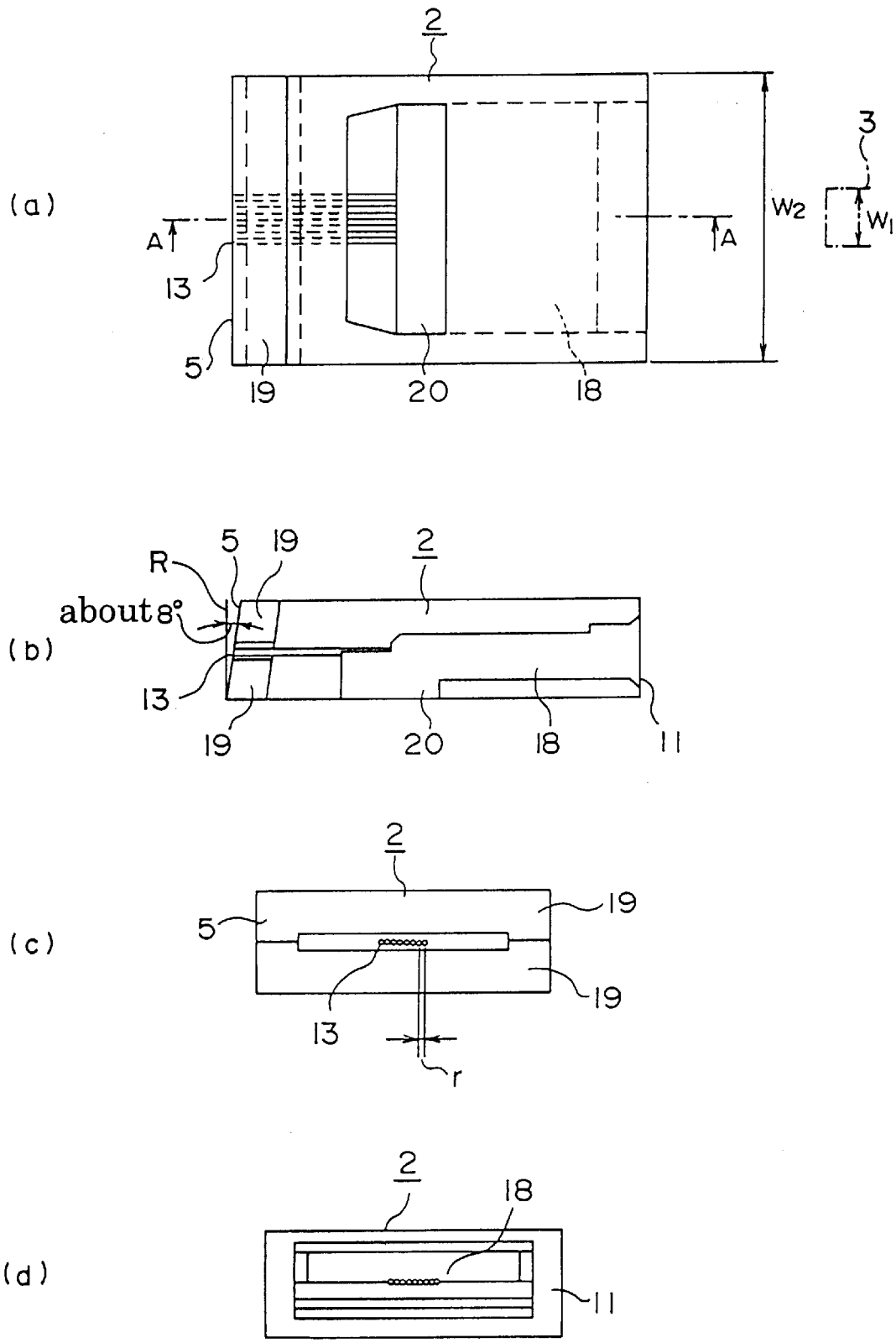
FIGS. 25(a)–(d) is a detailed view of a ferrule 2 which constitutes a multiple-core optical connector of FIG. 24.
Figure 26:
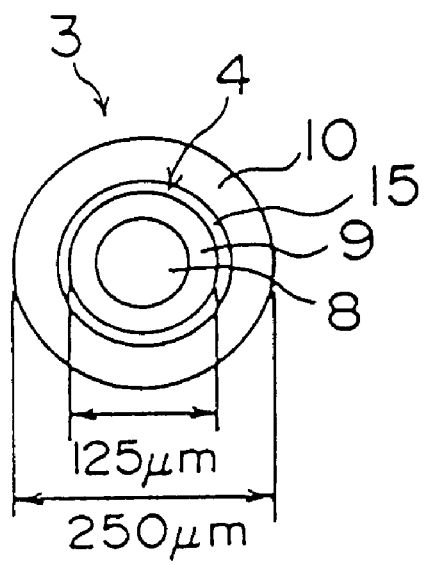
FIG. 26 is a structural cross-sectional view of an optical fiber cored line which is generally known.
Figure 27:
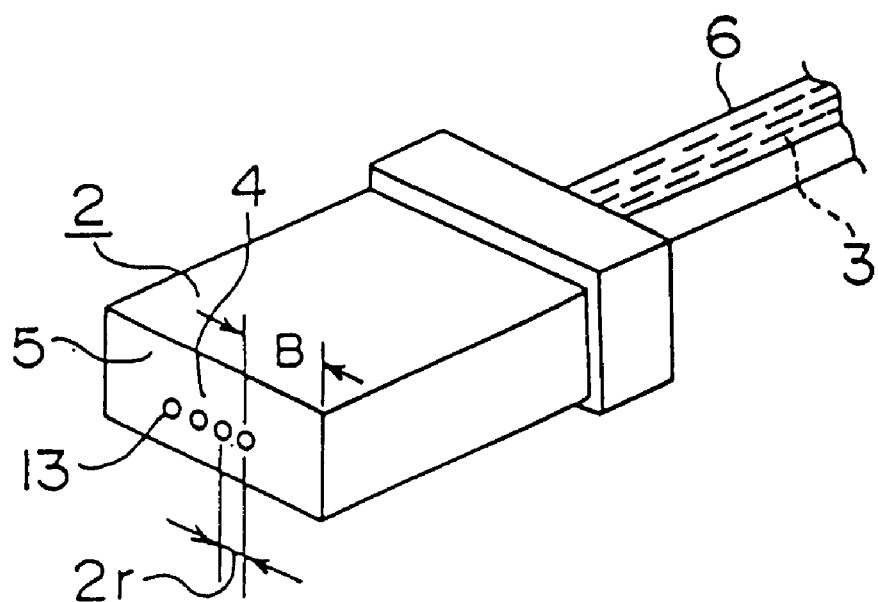
FIG. 27 is a perspective view of a conventional multiple-core optical connector.

Furthermore, with the preferred embodiment, since a filter 16 is provided on the flat substrate 21, the unit price of the flat substrate 21 of multiple-core optical connectors will be made further cheaper than that of waveguide substrate of an optical waveguide component, in comparison with a case where a filter is provided on the waveguide substrate at the optical waveguide component side as in the conventional example. Therefore, an effect can be obtained, by which the total cost of connection products in which a multiple-core optical connector and optical waveguide components are integrally connected to each other can be decreased with respect to the same yield. In this regard, in the preferred embodiment, since a rectangular plate-like filter of simple construction is used without use of a combtooth-like filter shown in FIG. 23(b) employed in an optical waveguide component, the manufacturing process of the filter itself can be facilitated, whereby the production yield of the filter can be increased, resulting in further lowering the production cost.

Furthermore, in the preferred embodiment, as shown in FIG. 4(a), a groove-formed inclined surface at outer ends of the array guide grooves 26 formed on the flat substrate 21 is elongated so as to reach the upper surface 24 of the flat substrate 21, wherein the upper surface 24 of the flat substrate 21 and the upper ends of the first and second bare optical fibers 4a, 4b are covered by the pressing member 23 with almost no clearance. Therefore, for example, as shown in FIG. 4(b), differing from a case where a clearance is formed between the upper surface 24 of the flat substrate 21 and the pressing member 23, almost no adhesive agent exists between the upper surface 24 of the flat substrate 21 and the bottom of the pressing member 23. Accordingly, as in a case where a clearance is formed between the upper surface 24 of the flat substrate 21 and the pressing member 23, the bare optical fibers 4a, 4b at both end sides of the array will not be pulled outward by the adhesive agent being coated in the clearance, for example, due to thermal contraction of an adhesive agent when the adhesive agent is hardened or the temperature changes. All the first and second bare optical fibers 4a, 4b are securely accommodated in the respective corresponding array guide grooves 22 and arrayed therein, thereby causing the arraying accuracy of the first and second bare optical fibers 4a, 4b in the array guide grooves 22 to be improved. Therefore, the production yield of multiple-core optical connectors can be increased, further resulting in a lowering of the production cost.

Furthermore, in the preferred embodiment, if at least any one of the flat substrate 21 and the pressing member 23 is made of transparent material although both of them are made of transparent material, it will become possible to irradiate ultraviolet rays (UV) to the connection end face 5 side when a multiple-core optical connector according to the preferred embodiment is connected to an optical member at the mating connection side, UV connection by an UV adhesive agent, etc. is able to be employed, which has high reliability. Furthermore, if the pressing member 23 is made of transparent material, it will become possible to easily check the final array state of the respective bare optical fibers 4a, 4b inserted into the array guide grooves 22 of the flat substrate 21 in addition to the abovementioned ultra violet ray irradiation being possible.

Figure 5:
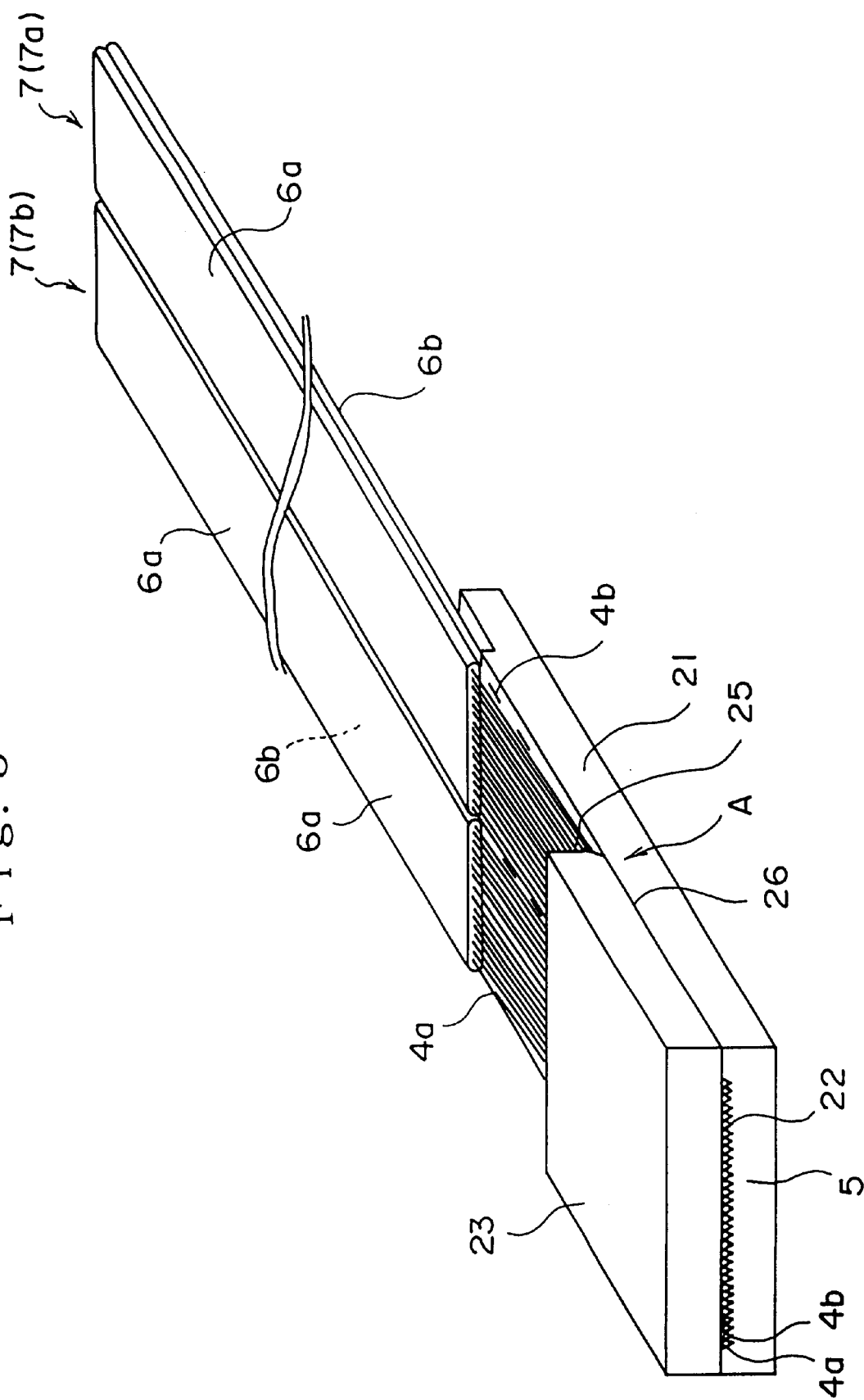
FIG. 5 is a perspective view showing a second preferred embodiment of a multiple-core optical connector according to the invention.
Figure 7:
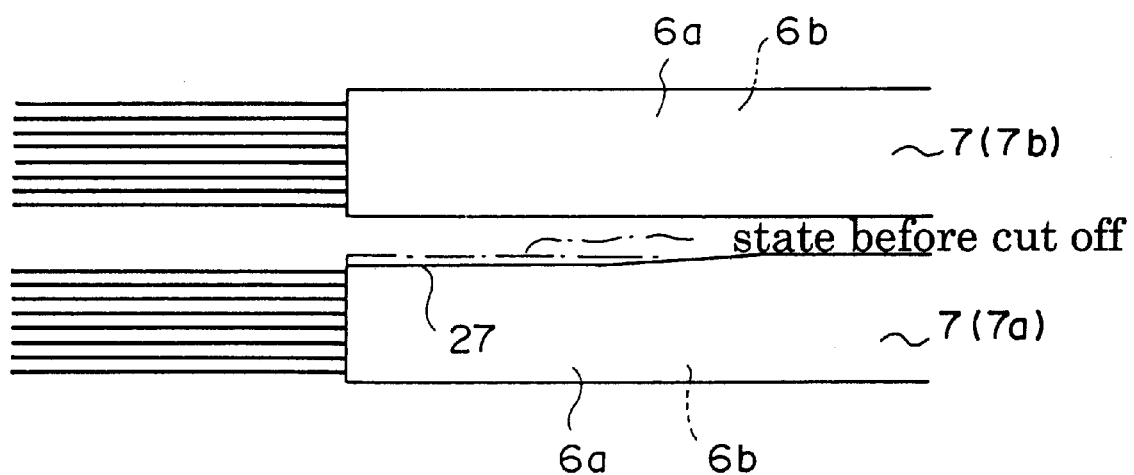
FIG. 7 is a view showing the construction of a pair of optical fiber tapes 7, wherein they are juxtaposed with a clearance for illustration although they are juxtaposed with almost no clearance in the abovementioned second preferred embodiment.

In FIG. 5, a perspective view of a second preferred embodiment of a multiple-core optical connector according to the invention is illustrated. As in the abovementioned first preferred embodiment, the second preferred embodiment is such that the first bare optical fibers 4a and the second bare optical fibers 4b, for which the coatings of the tip end side of the first optical fiber tape 6a and second optical fiber tape 6b disposed so as to overlap each other are removed, are alternately array-converted and are disposed on the array guide grooves 22 of the flat substrate 21 and the first and second bare optical fibers 4a, 4b at the tip end side of the array are placed in and fixed in the array guide grooves 22. In the second preferred embodiment, a plurality of pairs (two pairs) of fiber tapes 7 each consisting of the first optical fiber tape 6a and second optical fiber tape 6b disposed so as to overlap each other are juxtaposed in the direction of arraying optical fibers. Furthermore, as shown in FIG. 7, the first optical fiber tape 6a and second optical fiber tape 6b of the pair of fiber tape 7a at this side in the drawing, of these two pairs of fiber tapes 7 (7a, 7b) are cut off at the side 27 thereof adjacent to the other pairs of fiber tapes 7b.

Figure 6:
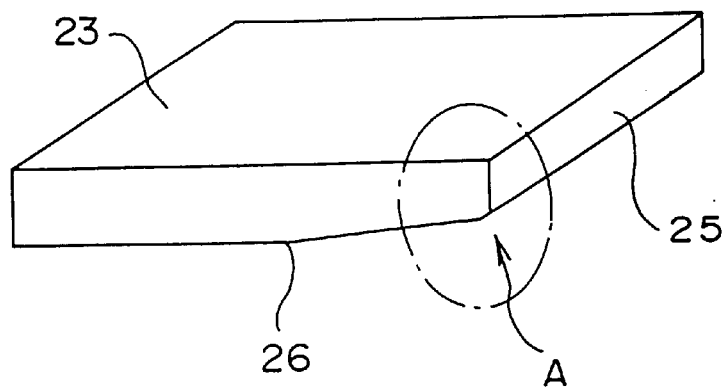
FIG. 6 is an explanatory view showing a pressing member used for the second preferred embodiment.

Furthermore, in the preferred embodiment, as shown in FIG. 6, roundness ("A" in the drawing) to lighten the fitting of optical fibers to the fiber pressing surface 26 side is formed at the rear end side 25 of the pressing member 26. Furthermore, in the preferred embodiment, although a filter insertion groove 17 and a filter 16 which are employed in the abovementioned first preferred embodiment are not provided, it is also possible to construct a multiple-core optical connector with a filter insertion groove 17 and a filter 16 employed as in the abovementioned first preferred embodiment.

The second preferred embodiment is constructed as described above. Next, a description is given of a manufacturing method of multiple-core optical connector according to the second preferred embodiment. Firstly, for example, as shown in FIGS. 8(a) and (b), optical fibers (in the drawings, the first bare optical fibers 4a), for which the coatings any one (in the drawings, the optical fiber tape 6a) of the first optical fiber tape 6a and the second optical fiber tape 6b are removed, are placed every other groove in a plurality of array guide grooves 22 of the flat substrate 21.

Figure 8:
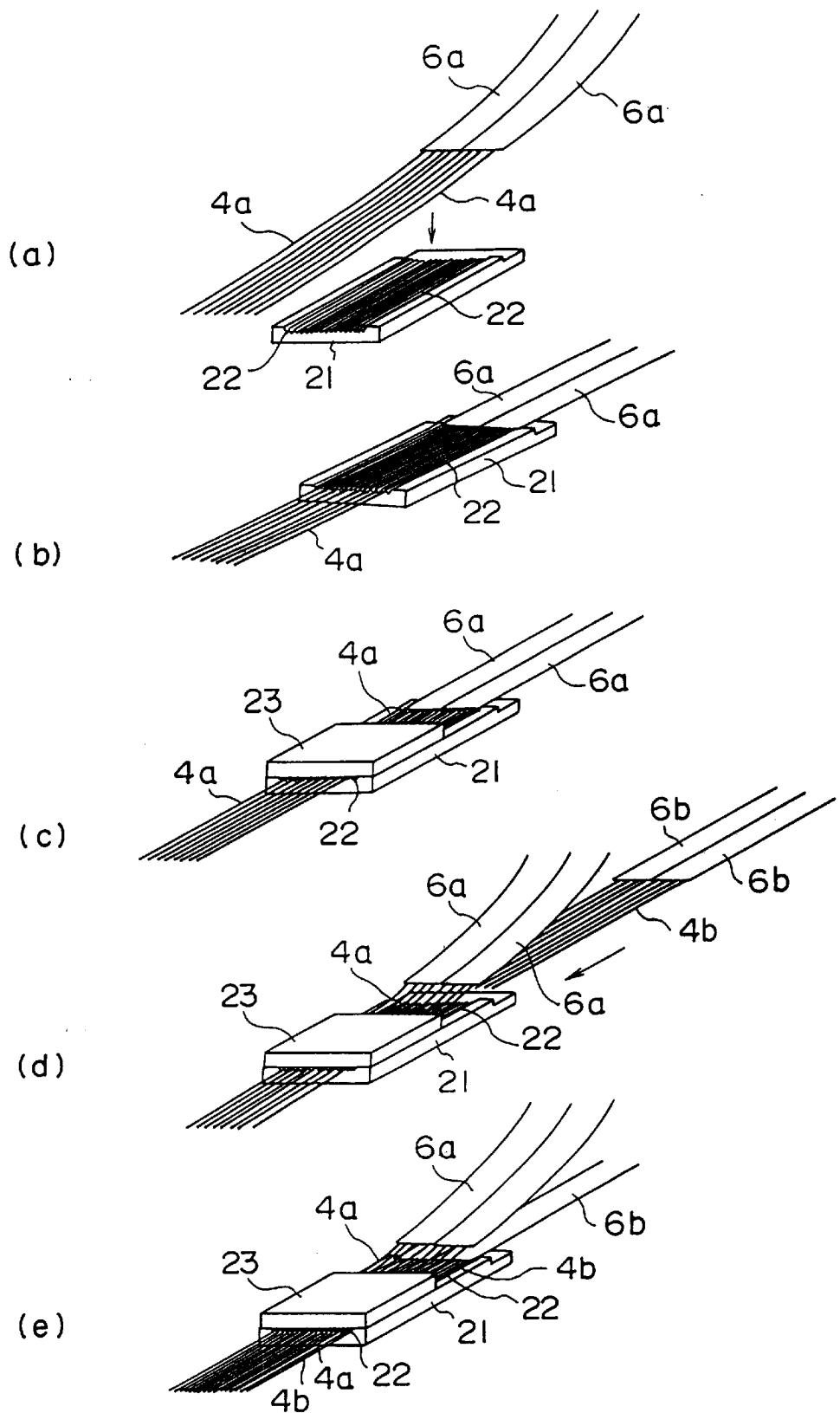
FIGS. 8(a)–(e) is an explanatory view showing one example of a manufacturing method of multiple-core optical connectors according to the abovementioned preferred embodiment.

Next, as shown in FIG. 8(c), the bare optical fibers 4a are pressed by the pressing member 23 in this state. Thereafter, as shown in FIGS. 8(d) and (e), optical fibers (in the drawings, the second bare optical fibers 4b), for which the coating of the other optical fiber tape (in the drawings, the optical fiber tape 6b) of the first optical fiber tape 6a and the second optical fiber tape 6b are removed, are inserted from the underside of the bare optical fibers 4a pressed by the pressing member 23 and the bare optical fibers 4b are inserted into the clearance formed by the pressing member 23 and the array guide grooves 22 remaining every other groove. Thereby, the first bare optical fibers 4a and the second bare optical fibers 4b are alternately arrayed adjacent to each other in the respective array guide grooves 22 at the tip end side of the flat substrate 21 and are array-converted and accommodated therein, And both the first and the second bare optical fibers are pressed by the pressing member 23.

Figure 9:
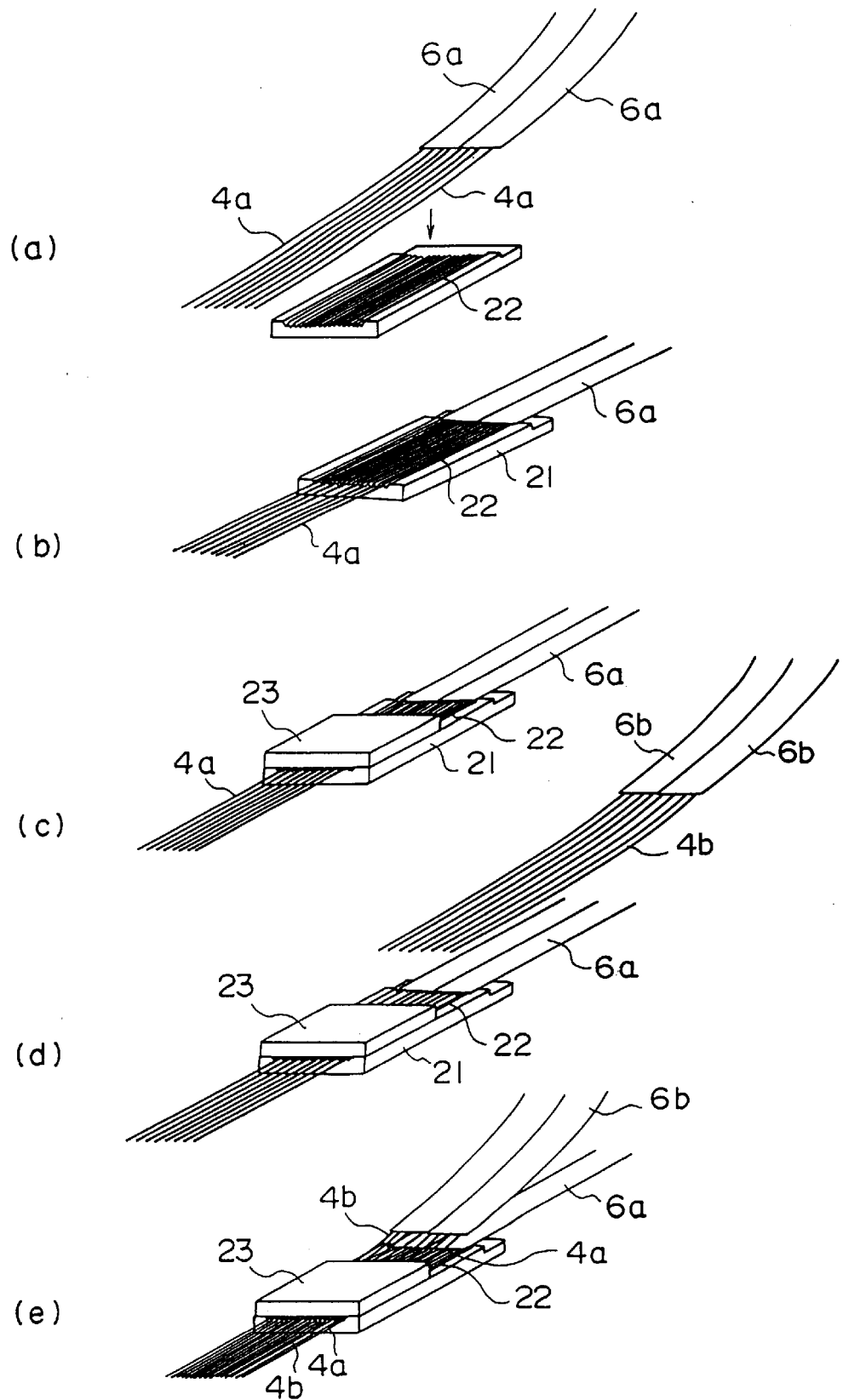
FIGS. 9(a)–(e) is an explanatory view showing another example of a manufacturing method of multiple-core optical connectors according to the abovementioned preferred embodiment.

Furthermore, when the bare optical fibers 4b of the second optical fiber tape 6b are arrayed in the array guide grooves 22, as described above, for example, as shown in FIGS. 9(d) and (e), the second bare optical fibers 4b may be inserted from the upside of the first bare optical fibers 4a and may be inserted into the clearance formed by the pressing member 23 and the array guide grooves 22 remaining every other groove instead of inserting the bare optical fibers 4b from the underside of the bare optical fibers 4a into the clearance formed by the pressing member 23 and the array guide grooves 22.

Next, the flat substrate 21 and the pressing member 23 are fixed by a thermohardening type adhesive agent, etc. When supplying the adhesive agent, as shown in FIGS. 10(a) and (b) in the preferred embodiment, adhesive agent is supplied to the connection end face side of each of the first bare optical fibers 4a and the second bare optical fibers 4b. In detail, as shown in these drawings, the adhesive agent is coated to the first and second bare optical fibers 4a, 4b protruding from the tip end side of the flat substrate 21 and the pressing member 23. If so, the adhesive agent is caused to permeate into the entirety of the clearance between the first, second bare optical fibers 4a, 4b, the array guide grooves 22 and the pressing member 23 by a capillary action. Therefore, the adhesive agent is supplied into the abovementioned clearance by utilizing the capillary action, thereby causing a plurality of the disposed first and second bare optical fibers 4a, 4b permanently to be fixed in the array guide grooves 22.

Accordingly, as in the first preferred embodiment, as necessary, adhesive agent is coated on the upside of the bare optical fibers 4a, 4b exposed onto the flat substrate 21, and finally the connection end face 5 at the tip end side of the flat substrate 21 are polished along with the pressing member 23 and the end face of the bare optical fibers 4a, 4b, thereby causing the object multiple-core optical connector to be produced.

According to the preferred embodiment, it is possible to obtain the effects which is the same as those of the first preferred embodiment, and simultaneously by forming a round part to lighten the fitting with respect to the optical fibers at the fiber pressing surface 26 side at the rear end side 25 of the pressing member 23, for example, as shown in FIG. 21(b), since it is possible to securely prevent the bare optical fibers 4a from being interrupted due to an excessive force directly given to the bare optical fibers 4a at the portions where the pressing member 23 is fitted to the bare optical fibers 4a, it is possible to further increase the production yield of multiple-core optical connectors.

Furthermore, in the preferred embodiment, although pairs of fiber tape 7a, 7b of the first optical fiber tape 6a and second optical fiber tape 6b, which are disposed to overlap each other, juxtaposed in the direction of arraying optical fibers, the side 27 where the first and second optical fiber tapes 6a, 6b of the pair 7a of fiber tape are made adjacent to the other pair 7b of optical fiber tape is cut off. Therefore, the coatings portion where the first and second optical fiber tapes 6a, 6b are made adjacent to each other do not become any obstacle, whereby it is possible to array all the bare optical fibers 4a, 4b in the corresponding array guide grooves at a high accuracy without greatly bending the bare optical fibers 4a, 4b at the outside of the optical fiber tapes 6a,6b. Furthermore, it is also possible to juxtapose pairs 7a, 7b of optical fiber tapes in multiple-core optical connectors at a high concentration.

Furthermore, as in this preferred embodiment, since the depth of the array guide grooves 22 becomes shallow in a case where the array guide grooves 22 of a flat substrate 21 are formed at a pitch interval which is roughly equal to the outer diameter of bare optical fibers 4, the work of array-converting one by one the first bare optical fibers 4a of the first optical fiber tape 6a and the second bare optical fibers 4b of the second optical fiber tape 6b and alternately accommodating the same in the corresponding array guide grooves 22 as shown in FIG. 22 is not so efficient. However, according to the manufacturing method of multiple-core optical connectors according to the preferred embodiment, since the second bare optical fibers 4b are inserted every other groove in the remaining array guide grooves 22 after the first bare optical fibers 4a are arrayed every other groove in the array guide grooves 22, the array working efficiency of the bare optical fibers 4a, 4b can be improved.

In particular, according to the manufacturing method of multiple-core optical connectors according to the preferred embodiment, the first bare optical fibers 4a to be arrayed in the array guide grooves 22 are firstly pressed by the pressing member 23, and the second bare optical fibers 4b are inserted from the upside or downside of the first bare optical fibers 4a in this state and are inserted into the clearance formed by the pressing member 23 and the array guide grooves 22 remaining every other groove. Therefore, the first bare optical fibers 4a firstly arrayed in the array guide grooves 22 do not come off from the array guide grooves 22, and the second bare optical fibers 4b can be more easily inserted. Accordingly, the production yield of multiple-core optical connectors can be further improved.

Furthermore, in a case where an adhesive agent to be used for permanent fixing of the flat substrate 21, the first and second optical fibers 4a, 4b and the pressing member 23 is supplied from the rear end side 25 of the pressing member 23, the adhesive agent is caused to permeate into the clearance between the flat substrate 21, the first and second bare optical fibers 4a, 4b and the pressing member 23 by a capillary action. However, there is a case where the adhesive agent does not reach the connection end face 5 side of multiple-core optical connectors, and there is a case where air bubbles may exist even though the adhesive agent reaches there. If such a case arises, missing of adhesive agent and mixing air bubbles at the connection end face 5 side result in permeation of air bubbles into the boundary area where a multiple-core optical connector is connected to other optical components, thereby causing a connection loss to be increased. Furthermore, the air bubbles and missing areas of the adhesive agent are expanded by thermal changes, etc. thereby increasing a load to the connection end face side of the first and second bare optical fibers 4a, 4b, and resulting in adverse influences upon the connection end face side of the first and second bare optical fibers 4a, 4b.

To the contrary, in the preferred embodiment, since an adhesive agent is supplied from the connection end face side of multiple-core optical connectors and, by a capillary action, is caused to permeate from the connection end face side of the first and second bare optical fibers 4a, 4b into the clearance formed by the first, second bare optical fibers, 4a, 4b, the array guide grooves 22 of the flat substrate 21, and the pressing member 23, no missing of the adhesive agent, which permeated into the clearance formed by the first, second bare optical fibers 4a, 4b, the array guide grooves 22 of the flat substrate 22 and the pressing member 23, nor generation of air bubbles arises at the connection end face side of the first and second bare optical fibers 4a, 4b. Furthermore, it is possible to avoid any adverse influence due to the missing of the abovementioned adhesive agent and/or air bubbles. Therefore, in the preferred embodiment, it become possible to prevent the connection loss with other optical components of multiple-core optical connectors from being increased, and possible to manufacture multiple-core optical connectors which has a low connection loss and can be optically connected to other optical components. Furthermore, multiple-core optical connectors having high long-term reliability, which are less influenced by heat, etc. can be provided.

Figure 11:
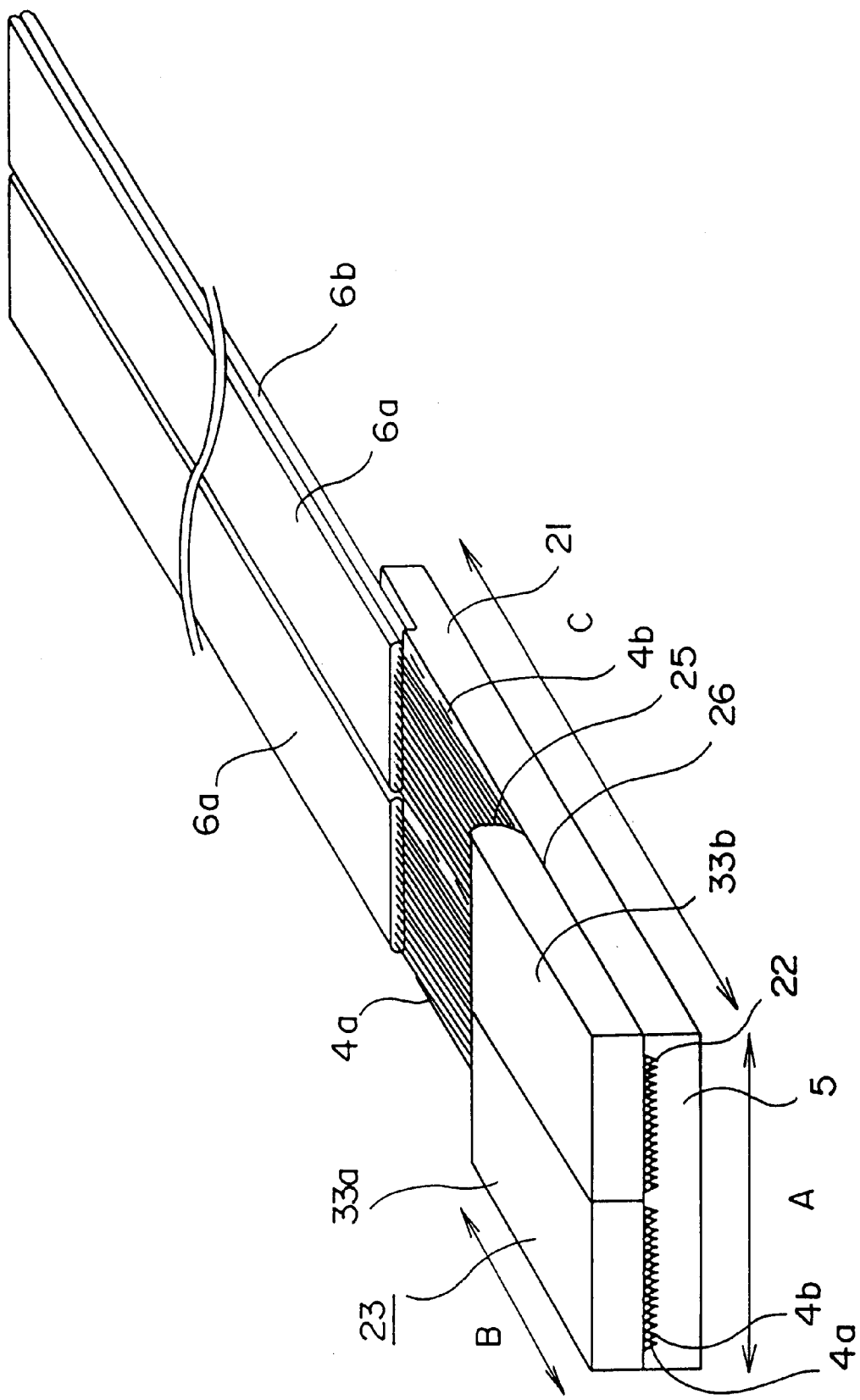
FIG. 11 is a perspective view showing a third preferred embodiment of a multiple-core optical connector according to the invention.

A perspective view of a third preferred embodiment of a multiple-core optical connector according to the invention is illustrated in FIG. 11. The preferred embodiment is constructed to be almost the same as the second preferred embodiment. A feature at which the third preferred embodiment is different from the second embodiment is that the pressing member is composed of two pressing member pieces 33a, 33b juxtaposed in the direction of arraying optical fibers. Furthermore, it may be constructed in the third preferred embodiment that as in the abovementioned first preferred embodiment, a filter insertion groove 17 and a filter 16 may be provided on the flat substrate 21.

The preferred embodiment is constructed as described above, and can be manufactured by the manufacturing method which is similar to that in the abovementioned second preferred embodiment. The third preferred embodiment brings the same effects as those of the abovementioned second preferred embodiment.

As in this preferred embodiment, since the number of cores of the first and second bare optical fibers 4a, 4b becomes 32 cores in total, for example, the length A in the drawing will be about 6 mm, the length B will be about 5 mm, and the length C will be about 10 mm. If the width A of the pressing member 23 is widened as shown above due to thermal contraction being produced on the adhesive agent and the pressing member 23 by thermal changes although the flat substrate 21, the first, second bare optical fibers 4a, 4b and the pressing member 23 are fixed by an adhesive agent, there is a fear that the pressing member 23 may be cracked due to differences of the thermal contraction. However, in the preferred embodiment, since the pressing member 23 is formed of two pressing member pieces 33a, 33b, strains resulting from differences of the abovementioned thermal contraction can be easily absorbed, it is possible to prevent the pressing member 23 from being cracked, resulting in improvement of the production yield of multiple-core optical connectors and of the long-term reliability thereof.

Should any case arise where the bare optical fibers 4a, 4b are re-arrayed, it becomes much easier to re-array the bare optical fibers 4a, 4b if the pressing member 23 is divided into two pressing member pieces as in the abovementioned preferred embodiment.

Figure 12:
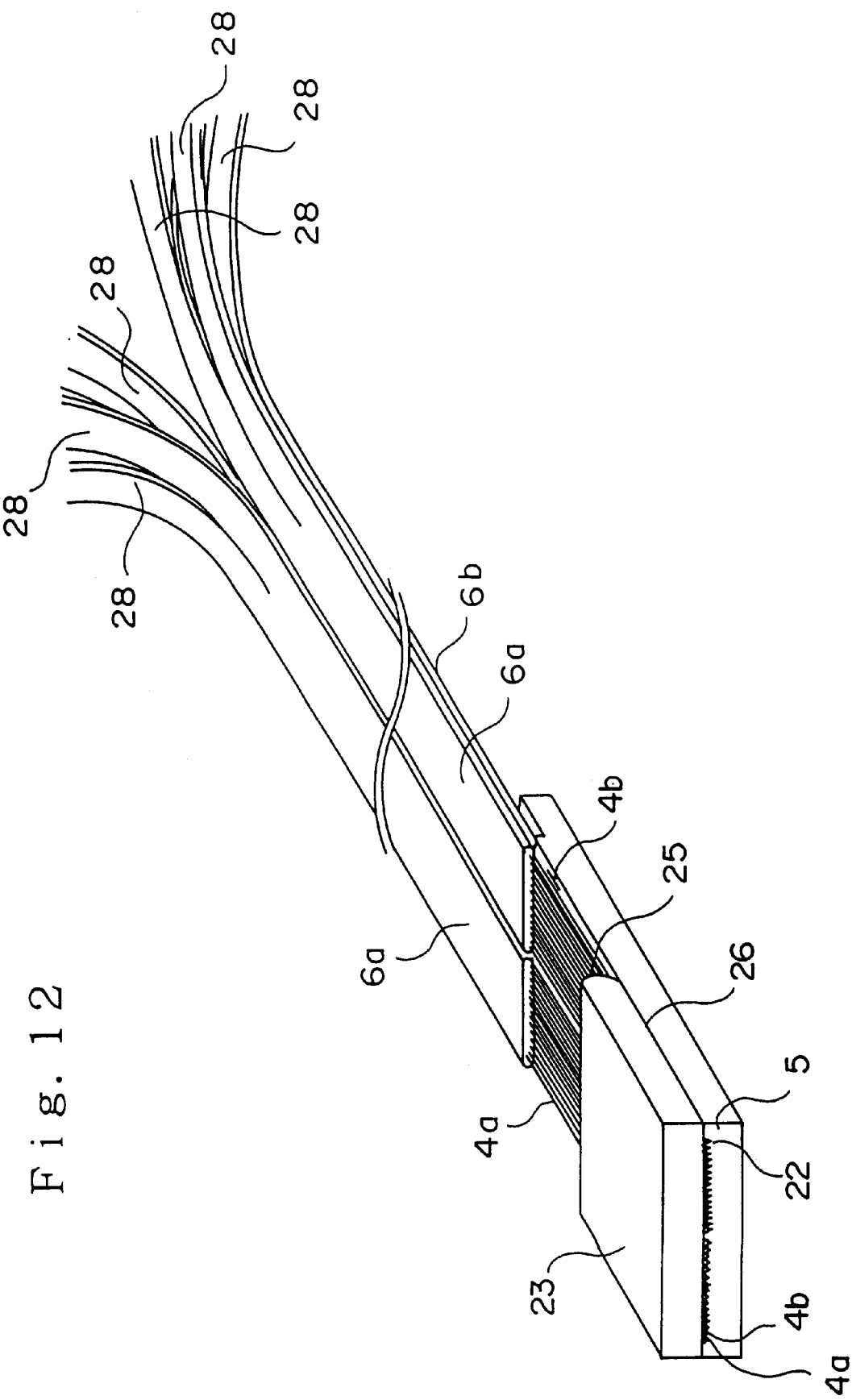
FIG. 12 is a perspective view showing a fourth preferred embodiment of a multiple-core optical connector according to the invention.

A perspective view of a fourth preferred embodiment of multiple-core optical connectors according to the invention is illustrated in FIG. 12. The fourth preferred embodiment is also constructed to be almost the same as the abovementioned second preferred embodiment, and a feature at which the fourth preferred embodiment is different from the abovementioned second preferred embodiment is that both the first and second optical fiber tapes 6a, 6b are branched at the terminal side 28 at the incident and outgoing ends. As described above, the first and second optical fiber tapes 6a, 6b are an optical fiber tape in which the first and second 8-core bare optical fibers 4a, 4b are juxtaposed. In this preferred embodiment, the first and second optical fiber tapes 6a, 6b are branched to be 4-core optical tapes at the terminal end side 28 at the incident and outgoing ends. Furthermore, in the preferred embodiment, it is constructed that as in the abovementioned first preferred embodiment, a filter insertion groove 17 and a filter 16 may be provided on the flat substrate 21.

As the preferred embodiment is constructed as described above, the preferred embodiment may be manufactured by the manufacturing method which is similar to that in the abovementioned second preferred embodiment, and the effects similar to those in the second preferred embodiment can be obtained.

Furthermore, in the preferred embodiment, it is possible to easily manufacture multiple-core optical connectors as in the abovementioned second and third preferred embodiments by using the first and second optical fiber tapes 6a, 6b in which eight-core optical fibers are juxtaposed, and simultaneously if, for example, the terminal side 28 is connected to the optical incident end by branching the first and second optical fiber tapes 6a, 6b at the terminal side 28 of the incident and outgoing ends, it will become possible for different signals to be inputted in each of the four-core optical fibers, whereby eight kinds of signals can be inputted in total.

That is, as in the preferred embodiment, in a case where a multiple-core optical connector is produced by using the first and second optical fiber tapes 6a, 6b in which optical fibers of a number of cores are juxtaposed and the terminal sides 28 of the first and second optical fiber tapes 6a, 6b are branched corresponding to necessary number of cores of the incident and outgoing ends, multiple-core optical connectors can be easily produced, and with such an excellent multiple-core optical connector, it is possible to make light incident and to cause the light to outgo corresponding to the necessary number of cores at the incident and outgoing ends.

Figure 13:
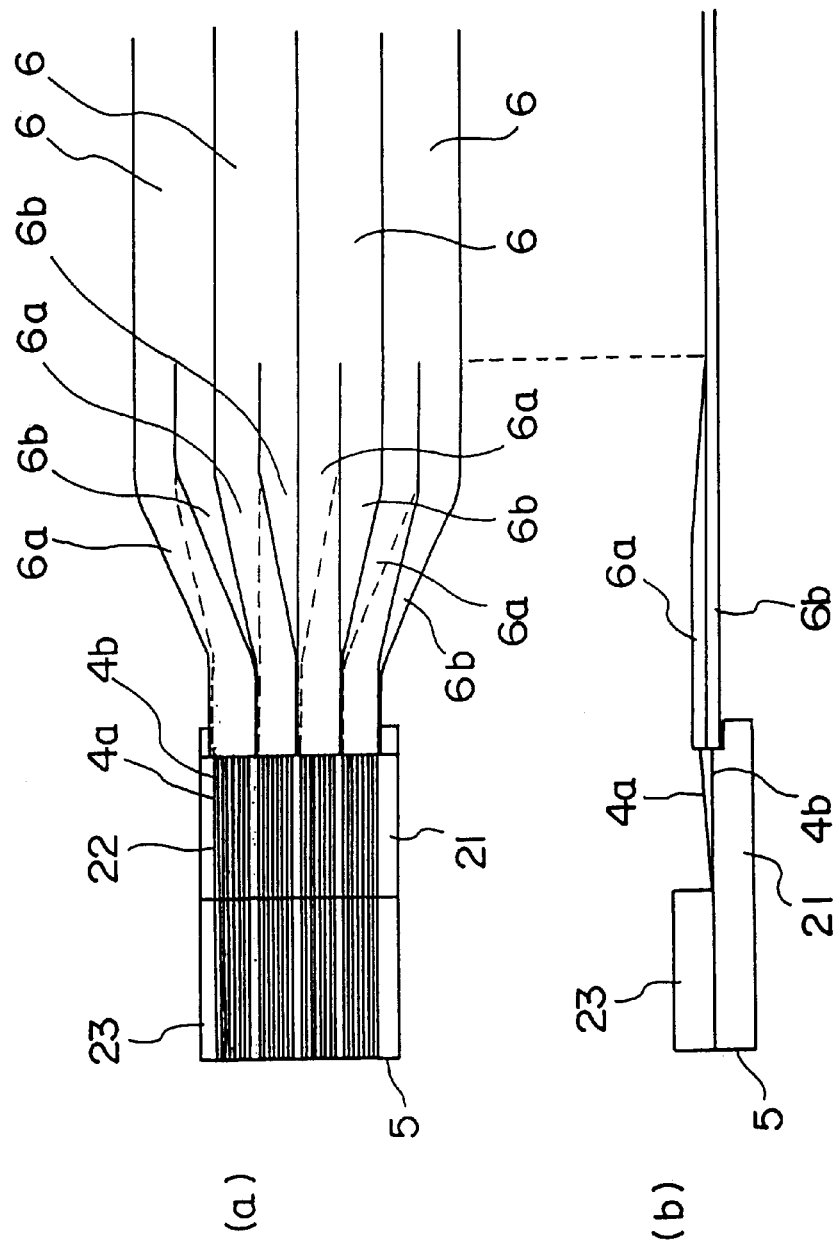
FIG. 13 is a compositional view of a fifth preferred embodiment of a multiple-core optical connector according to the preferred embodiment, wherein (a) thereof is a plan view, and (b) thereof is a side elevational view.

A plan view (a) and a side elevational view (b) of a fifth preferred embodiment of multiple-core optical connectors according to the invention are illustrated in FIG. 13. A feature of the preferred embodiment exists in that the terminal side of an optical fiber tape 6 (in the drawings, four-core optical fiber tape 6) composed of a plurality of optical fibers juxtaposed to be band-like are divided into two, wherein one of the two-divided optical fiber tapes is made into the first optical fiber tape 6a while the other divided optical fiber tape is made into the second optical fiber tape 6b. The optical fibers juxtaposed in the first optical fiber tape 6a are made into the first optical fibers while the optical fibers juxtaposed in the second optical fiber tape 6b are made into the second optical fibers.

Accordingly, the first bare optical fibers 4a in which the first optical fiber tape 6a is disposed so as to overlap on the upper surface of the second optical-fiber tape 6b and for which the tip end side coatings of the first optical fiber tape 6a are removed, and the second bare optical fibers 4b for which the tip end side coatings of the second optical fiber tape 6b are removed are array-converted one by one and are alternately accommodated in the corresponding array guide grooves 22 as in the first bare optical fibers 4a and the second bare optical fibers 4b in each of the abovementioned preferred embodiments. The fifth preferred embodiment is constructed as described above, and in this preferred embodiment, a filter insertion groove 17 and a filter 16 may be provided as in the abovementioned first preferred embodiment.

As the preferred embodiment is constructed as described above, when manufacturing multiple-core optical connectors of the preferred embodiment, an optical fiber tape 6 in which eight-core optical fibers are juxtaposed to be band-like is divided into two at the tip end side thereof, wherein one of the two-divided optical fiber tapes is made into the first optical fiber tape 6a and the other optical fiber tape is made into the second optical tape 6b, and furthermore, after the first optical fiber tape 6a is caused to overlap on the upper side of the second optical fiber tape 6b, multiple-core optical connectors can be produced by the manufacturing method similar to those in the abovementioned first and second preferred embodiments.

It is also possible for the preferred embodiment to provide the effects which are almost the same as those in the first to the fourth preferred embodiments.

Figure 14:
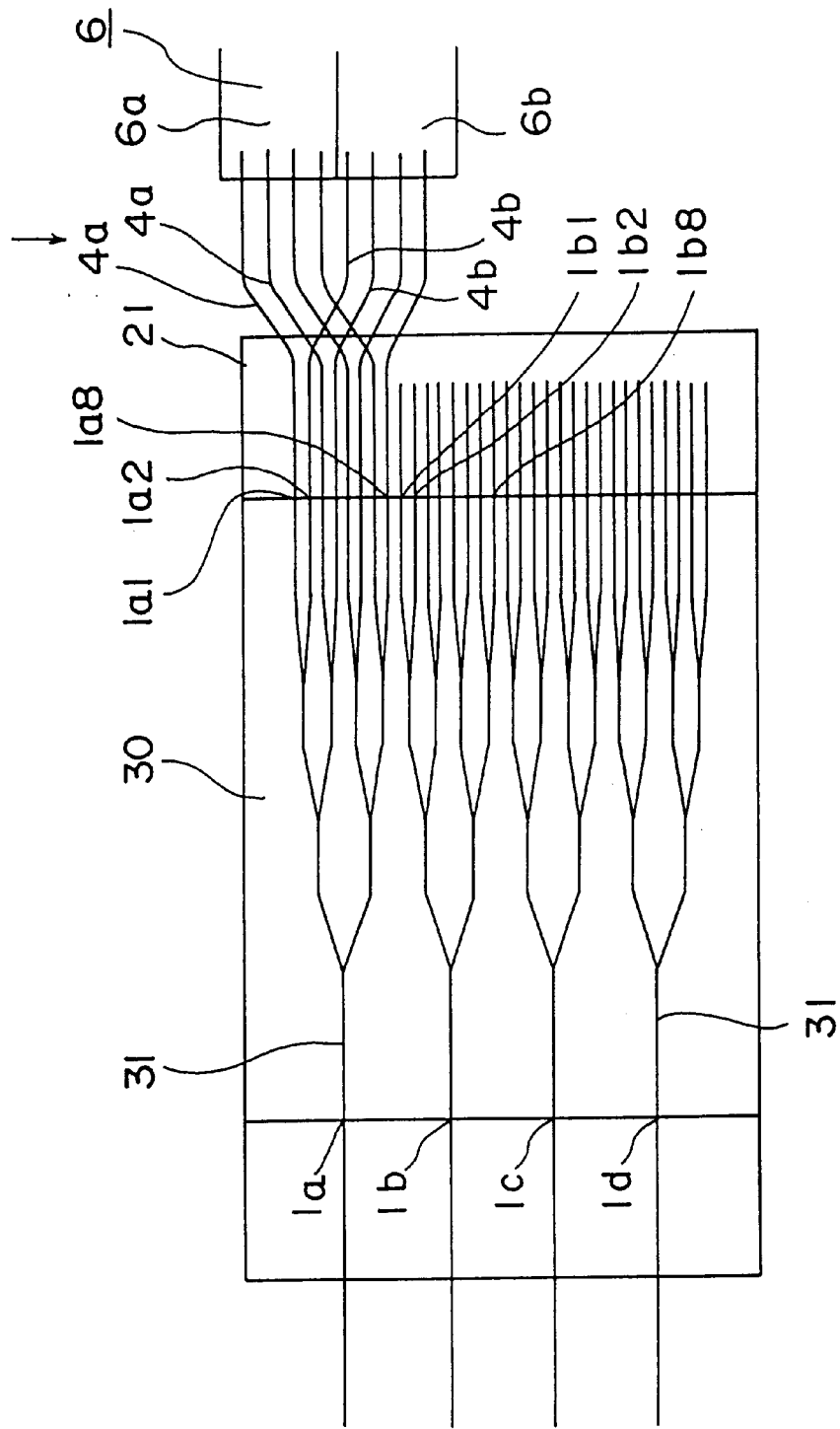
FIG. 14 is an exemplary view showing a state where a multiple-core optical connector according to the abovementioned fifth preferred embodiment is connected to the outgoing end side of an optical waveguide component 30 equipped with a 1×8 star coupler 31.
Figure 15:
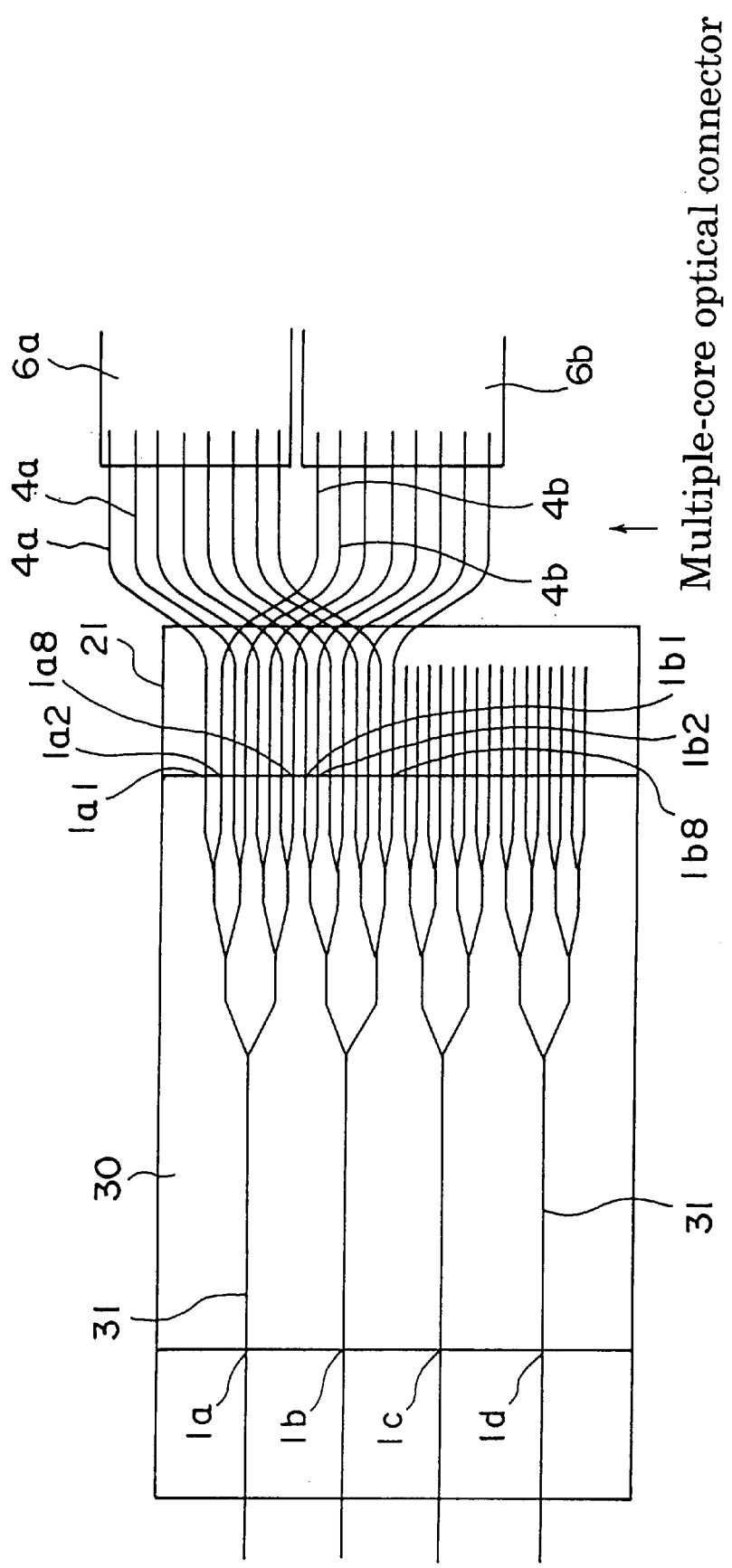
FIG. 15 is an exemplary view showing a state where the first and second bare optical fibers 4a,4b of the first and second optical fiber tapes 6a,6b, in which eight cores of optical fibers are juxtaposed, are connected to the outgoing end side of an optical waveguide component 30 equipped with 1×8 star couplers 31, FIGS. 16(a–e) is an explanatory view showing another preferred embodiment of a manufacturing method of a multiple-core optical connector according to the invention.

Furthermore, for example, as shown in FIG. 14 and FIG. 15, an optical waveguide component 30 in which 1×n star coupler such as 1×8 star coupler 31, etc. is formed is used for optical communication. However, in such an optical component, there is a case where it is requested that light made incident from the incident end 1a of, for example, 1×8 star coupler 31 and caused to outgo from the respective outgoing ends 1a1 to 1a8 is picked up by one optical fiber tape 6 and light made incident from the incident end 1b of the 1×8 star coupler 31 and caused to outgo from the outgoing ends 1b1 to 1b8 are picked up by another optical fiber tape 6. Furthermore, in FIG. 14 and FIG. 15, in order to easily understand the advancement direction of light, it is exemplarily illustrated that the first and second optical fiber tapes 6a, 6b of a multiple-core optical connector connected to the optical waveguide component 30 are juxtaposed. However, the first and second optical fiber tapes 6a, 6b are actually disposed so as to overlap each other.

Actually however, for example, as shown in FIG. 15, if a multiple-core optical connector in which the first and second bare optical fibers 4a, 4b having the coatings at the tip end side of the eight-core first and second optical fiber tapes 6a,6b removed are array-converted and alternately disposed is connected to the outgoing end side of the optical waveguide component 30, light caused to outgo from the outgoing end 1a1 of the 1×8 star coupler 31 is made incident into the first optical fiber tape 6a and is picked up from the first optical fiber tape 6a, and light caused to outgo from the outgoing end 1a2 of the 1×8 star coupler 31 is made incident into the second optical fiber tape 6b and is picked up by the second optical fiber tape 6b. That is, light made incident from the incident end 1a of the 1×8 star coupler 31 will spread over the two optical fiber tapes 6a, 6b and be made incident thereinto, and will be picked up therefrom. If so, it will become easier to meet the abovementioned requirement which is to pick up light made incident into one star coupler from one optical fiber tape 6.

Furthermore, in FIG. 15, since light made incident from the incident end 1b of the 1×8 star coupler 31 and caused to outgo from the outgoing ends 1b1 to 1b8 will be shared to and made incident into the first and second optical fiber tapes 6a, 6b, light made incident from the incident end 1a of the 1×8 star coupler 31 and light made incident from the incident end 1b thereof mixedly exist in the first optical fiber tape 6a, and simultaneously light made incident from the incident end 1a of the 1×8 star coupler 31 and light made incident from the incident end 1b thereof mixedly exist in the second optical fiber tape 6b.

To the contrary, as in the preferred embodiment, if the tip end side of the eight-core optical fiber tape 6 is divided to be made into the first optical fiber tape 6a and the second optical fiber tape 6b, as shown in FIG. 14, light made incident from the incident end 1a of the 1×8 star coupler 31 is caused to outgo from each of the outgoing ends 1a1 to 1a8 and is made incident into each of the first and second optical fiber tapes 6a, 6b. However, since the first and second optical fiber tapes 6a, 6b are inherently one optical fiber tape 6, the entire light made incident from the incident end 1a of the 1×8 star coupler 31 is made incident into one optical fiber tape 6 and picked up therefrom. Furthermore, similarly, light made incident from the incident end 1b of the 1×8 star coupler 31 is all made incident into another optical fiber tape 6 and is picked up therefrom, thereby preventing the mixed existence of the light described above.

Furthermore, the present invention is not limited to each of the abovementioned preferred embodiments. That is, various modifications and variations may be available. For example, in the abovementioned first preferred embodiment, although a filter 16 is inserted into each of the second bare optical fibers 4b at the second optical fiber tape 6b side, the filter 16 may be inserted into the first bare optical fibers 4a at the first optical fiber tape 6a side. Such an insertion structure of filter 16 may be applicable to the second through the fifth preferred embodiments. In this case, a filter insertion groove 17 is formed in a state where the first bare optical fibers 4a and the second bare optical fibers 4b are alternately arrayed in the array guide grooves 22 of the flat substrate 22, and the filter 16 may be inserted into the filter insertion groove 17.

Furthermore, the shape of the filter 16 is not rectangular but the filter may be a combtooth-like filter. That is, the shape thereof is not particularly limited.

Still furthermore, in the abovementioned first preferred embodiment, although a filter insertion groove 17 is provided, into which a filter 16 is inserted, the filter insertion groove 17 and filter 16 may be omitted, and multiple-core optical connectors not incorporating any filter may be available.

Figure 16:
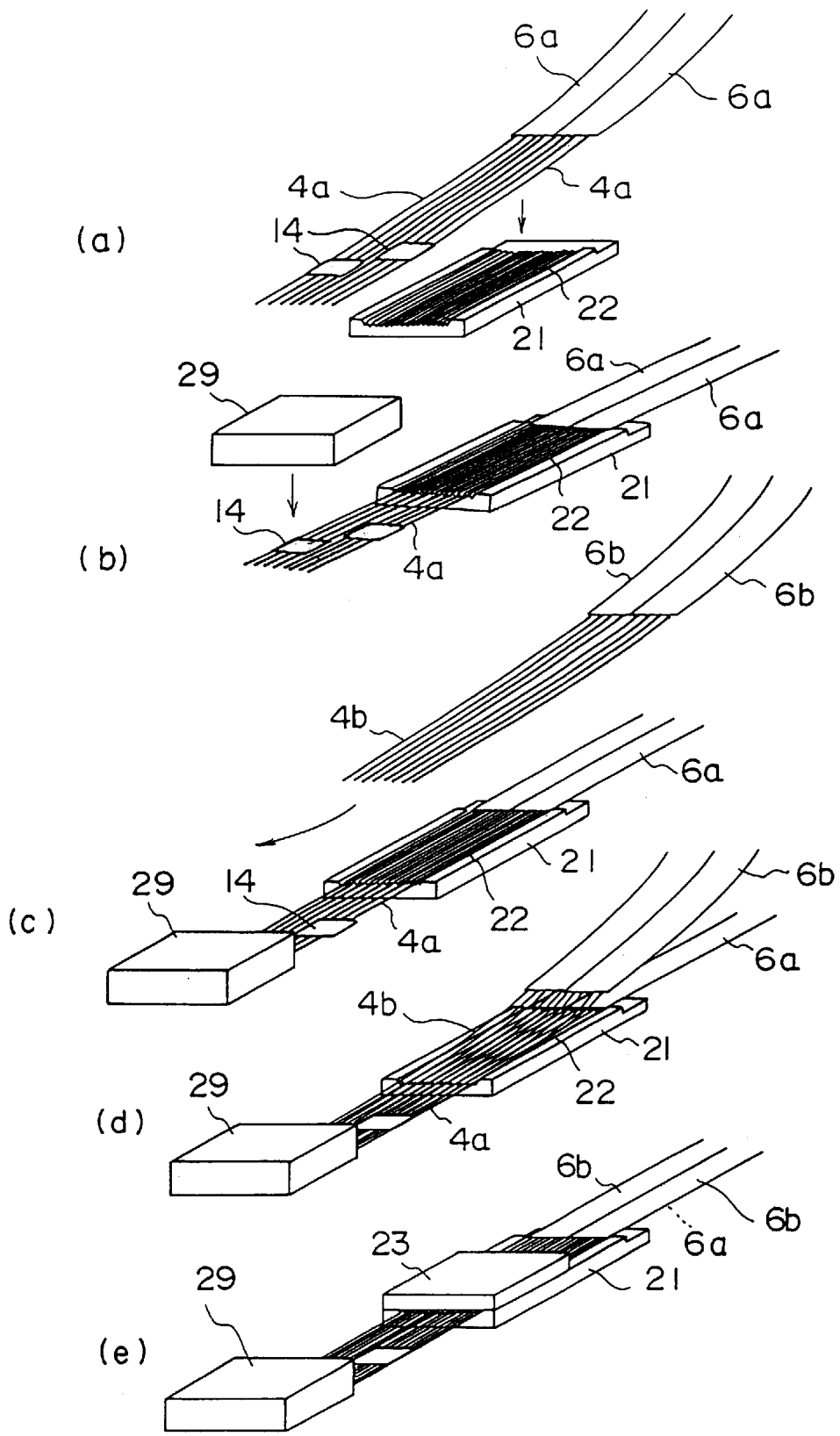

Furthermore, when manufacturing multiple-core optical connectors, it is possible to manufacture multiple-core optical connectors by, for example, the method shown in FIG. 16. That is, when peeling off the coatings of the first and second optical fiber tapes 6a, 6b, a part of the coatings of at least one (in the drawing, the first optical fiber tape 6a) of the optical fiber tapes 6a, 6b is removed, as shown in FIG. 16(a), and the remained coatings thereof is slid to the tip end side of optical fibers (the first bare optical fibers 4a), wherein the coating is caused to remain at the tip end side of the first bare optical fibers 4a as remaining coating 14, thereafter as shown in FIG. 16(b), the root sides of the first bare optical fibers 4a are arrayed every other groove in the array guide grooves 22 of the flat substrate 21.

Subsequently, in this state, the tip end side of the first bare optical fibers 4a is temporarily pressed by a temporary pressing member 29. Next, as shown in FIG. 16(c), the second optical fiber tape 6b is disposed from the upside of the first optical fiber tape 6a, and the second bare optical fibers 4b are arrayed in the array guide grooves 22 remaining every other groove. As shown in FIG. 16(d), the tip end side of the second bare optical fibers 4b are also pressed by the abovementioned temporary pressing member 29.

Thereafter, as shown in FIG. 16(e), the pressing member 23 is placed on the tip end side of the flat substrate 21 from the upside of the first and second bare optical fibers 4a, 4b arrayed in the array guide grooves 22, thereby causing the tip end sides of the first and second bare optical fibers 4a, 4b to be placed between the pressing member 23 and the flat substrate 21 and to be fixed therebetween. In this state, for example, an adhesive agent is coated to the first and second bare optical fibers 4a, 4b sides which protrude to the tip end side of the flat substrate 21 and the pressing member 23, whereby multiple-core optical connectors can be produced as in the abovementioned second preferred embodiment.

Thus, if a part of the coating is caused to remain at the tip end side of optical fibers as a remaining coating 14 in a state where the pair of the coatings of at least one of the first and second optical fiber tapes 6a, 6b is not removed and is slid toward the tip end side of the optical fibers, the bare optical fibers 4a, 4b of the optical fiber tapes 6a, 6b, the coating of which is caused to remain, are prevented by the remaining coating 14 from radially spreading over to be loose at its tip end side. Therefore, it is much easier to array the first and second bare optical fibers 4a, 4b in the array guide grooves 22.

Figure 17:
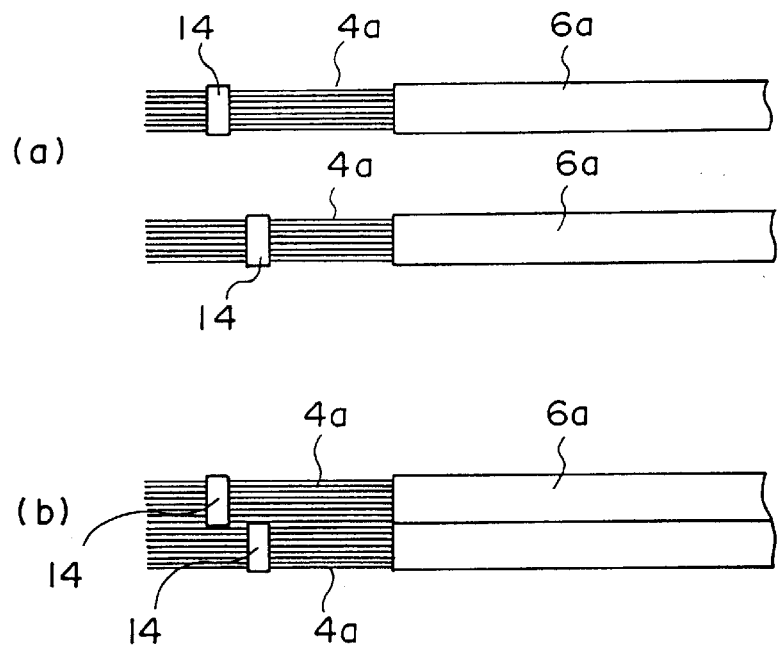
FIGS. 17(a)–(b) is a view showing a method of partially leaving a part of the coatings of the two first optical fiber tapes 6a and sliding the same toward the tip end side of optical fibers, and juxtaposing the optical fiber tapes 6a when producing a multiple-core optical connector according to the invention.

In particular, as shown in FIG. 16 and FIG. 17, when a plurality of optical fiber tapes (in the drawing, the first optical fiber tape 6a), a part of the coatings of which is left over, are prepared and and are juxtaposed in the direction of arraying optical fibers, the first bare optical fibers 4a are arrayed in the array guide grooves 22 of the flat substrate 21 after the remaining coating 14 of adjacent optical fiber tape 6a is slid in the lengthwise direction of optical fibers. Thereby, since it is possible to prevent the remaining coatings 14 from being brought into collision with each other, it is much easier to array the first bare optical fibers 4a in the array guide grooves 22.

Figure 18:
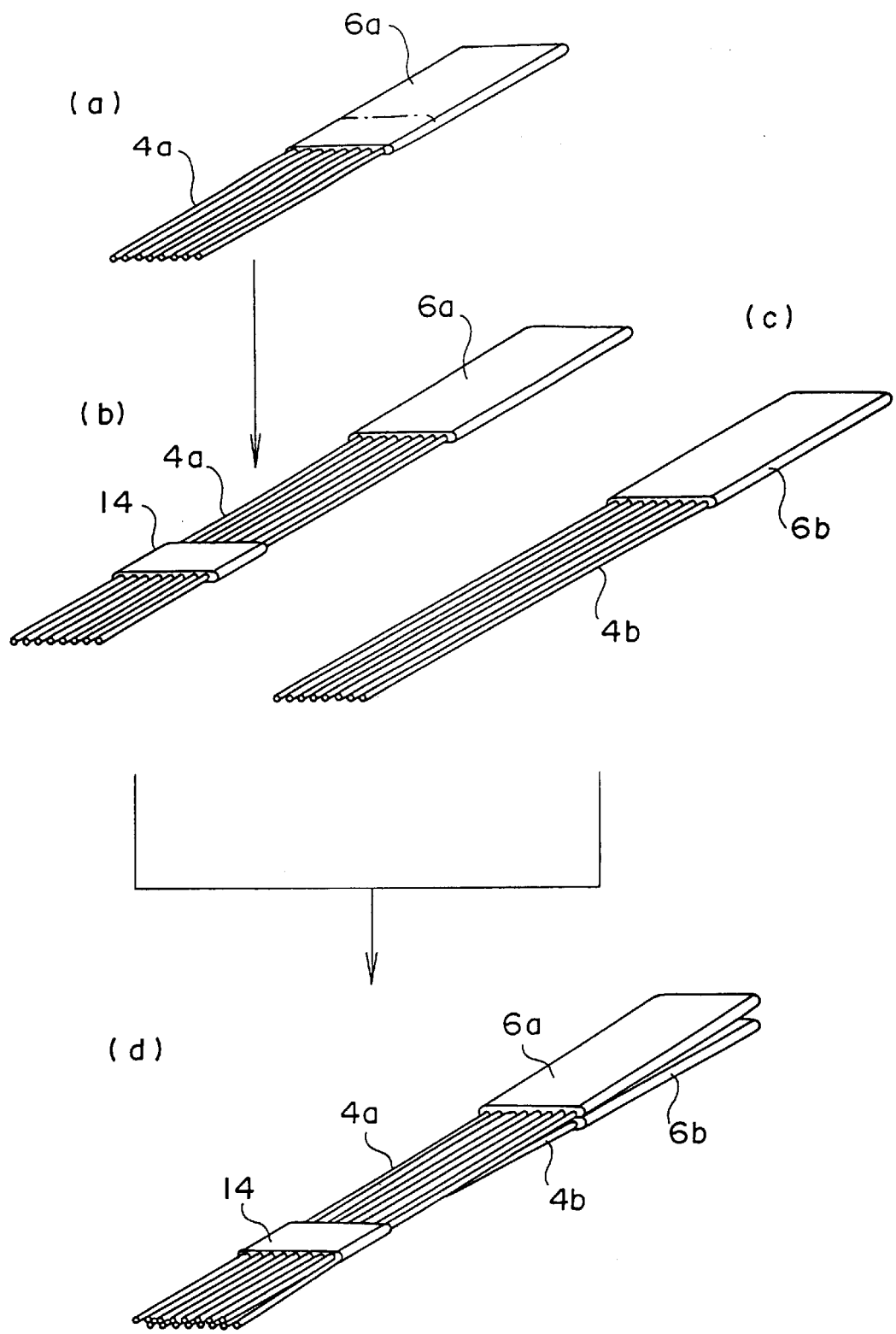
FIGS. 18(a)–(d) is an explanatory view showing a method of leaving a part of the coatings of the first optical fiber tape 6a and sliding the same toward the tip end side of the optical fibers, and overlapping the first optical fiber tape 6a and the second optical fiber tape 6b, the coatings of which are removed.

Furthermore, FIG. 18 shows one example of a peeling method of the coatings of the first and second optical fiber tapes 6a, 6b. After the coatings at the tip end side of the first optical fiber tape 6a are removed as shown in FIG. 18(a), a part of the remaining coatings at the tip end side is peeled off and is caused to slide toward the tip end side of the first bare optical fibers 4a as shown in FIG. 18(b), thereby forming a remaining coating 14. The first optical fiber tape 6a having the remaining coatings 14 is caused to overlap onto the second optical fiber tape 6b, the coatings at the tip end side of which are fully removed, as shown in FIG. 18(c). The state will be as shown in FIG. 18(d).

Figure 19:
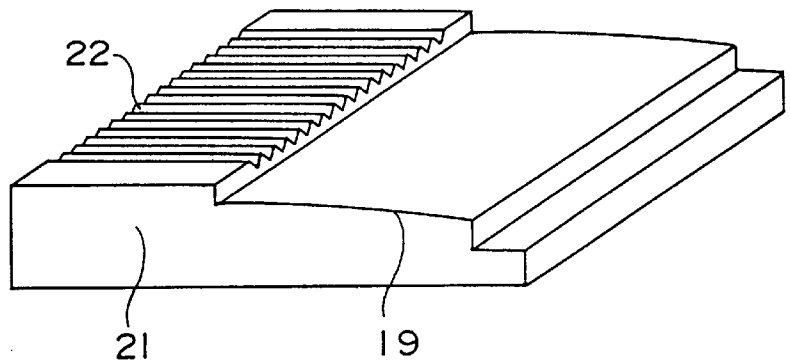
FIG. 19 is a view showing a flat substrate 21 used for the other preferred embodiments of a multiple-core optical connector according to the invention.
Figure 21:
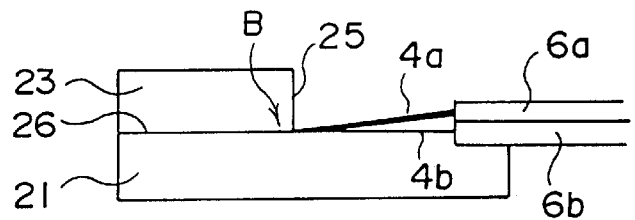
FIG. 21 is an explanatory view showing a portion where interruption is likely to occur in bare optical fibers 4a arrayed on the flat substrate 21 in a multiple-core optical connector.

Furthermore, in the abovementioned second through the fifth preferred embodiments, by forming a round part to lighten the fitting with respect to optical fibers at the fiber pressing surface 26 at the rear end side 25 of the pressing member 23, optical fibers can be prevented from being interrupted or broken at the position (In the drawing, "B") where the rear end side of the pressing member 23 is brought into contact with the optical fibers as shown in FIG. 21. However, instead of forming the round part, a tapered surface 19 is formed, as shown in FIG. 19, at the rear end side of the flat substrate 21 in a direction of thinning the thickness of the flat substrate 21, whereby the degree to which the fist bare optical fibers 4a is bent upward is equalized with the degree to which the second bare optical fibers 4b is bent downward, thereby preventing interruption or breakage of the first bare optical fibers 4a. Such a tapered surface may be formed in a process of molding glass when forming a flat substrate of, for example, glass, synthetic quartz, etc. Furthermore, thus, it is possible to form multiple-core optical connectors by forming a round part at the fiber pressing surface 26 at the rear end side 25 of the pressing member 23 as in the abovementioned second through the fifth preferred embodiments while a tapered surface 19 is formed on a flat substrate 21.

Figure 20:
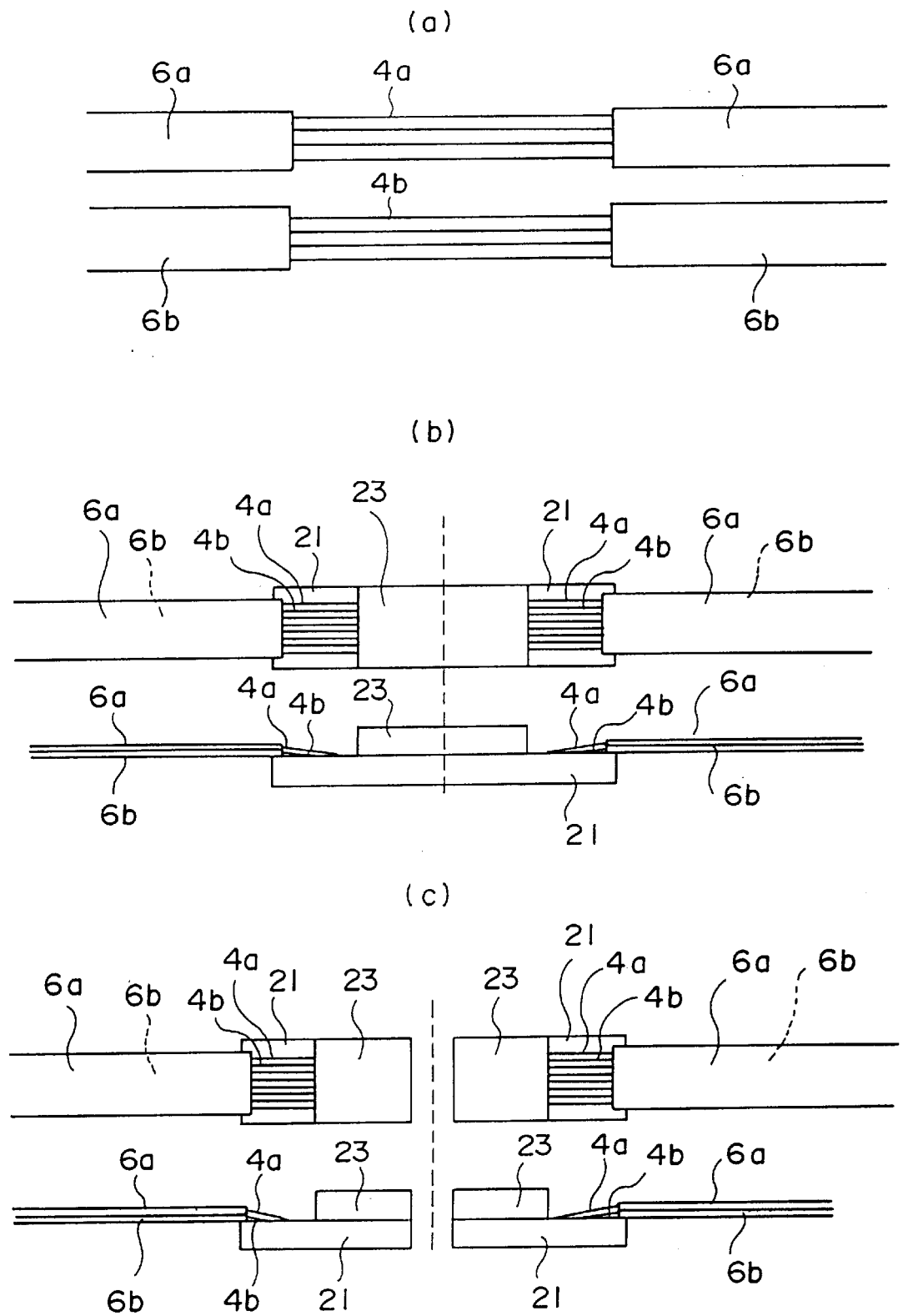
FIGS. 20(a)–(c) is an explanatory view showing still another preferred embodiment of a manufacturing method of multiple-core optical connectors according to the invention.

Still furthermore, when manufacturing multiple-core optical connectors, it is possible to produce multiple-core optical connectors by, for example, a method shown in FIG. 20. That is, as shown in FIG. 20(a), the coatings of the first and second optical fiber tapes 6a, 6b are removed halfway thereof, thereafter as shown in FIG. 20(b), the first and second bare optical fibers 4a, 4b which are exposed by removing the coatings thereof are array-converted so as to be alternately arrayed, wherein they are alternately arrayed in the array guide grooves 22 of the flat substrate 21. After that, a pressing member 23 is provided on the upper surface of the first and second bare optical fibers 4a, 4b. Accordingly, after the first and second bare optical fibers 4a, 4b are pressed by the pressing member 23, placed in the array guide grooves and fixed therein, the fixing portion where the pressing member 23 and the flat substrate 21 are divided and cut in the direction of crossing the optical fiber arraying direction (in the drawing, the direction orthogonal to the optical fiber arraying direction), whereby it is possible to produce two multiple-core optical connectors at one time.

If multiple-core optical connectors are produced by such a method, since two multiple-core optical connectors can be produced at a time, it becomes possible to remarkably efficiently produce multiple-core optical connectors, resulting in a decrease of the production cost.

Furthermore, according to the abovementioned third preferred embodiment, two pressing member pieces 33a, 33b are juxtaposed in the direction of arraying optical fibers and form a pressing member 23. In a case where the pressing member 23 is formed by pressing member pieces, the pressing member 23 may be formed by juxtaposing three or more pressing member pieces in the direction of arraying optical fibers.

Furthermore, in the abovementioned fourth preferred embodiment,, the terminal side of the incident and outgoing ends of the first and second optical fiber tapes 6a, 6b is branched into two to form multiple-core optical connectors. However, the terminal end side 28 of the incident and outgoing ends of the first and second optical fiber tapes 6a, 6b may be branched into three or more to form multiple-core optical connectors.

Still furthermore, in the abovementioned second through fifth preferred embodiments, the side 27, of only the first and second optical fiber tapes 6a, 6b of a pair 7a of the pairs 7a,7b of fiber tapes, which is adjacent to the pair 7b of fiber tape is cut off. However, the side, of the the first and second optical fiber tapes 6a, 6b of the pair 7b of fiber tape, which is adjacent to the other may be cut off. Still furthermore, the side 27, of the first and second optical fiber tapes 6a, 6b of the respective pairs 7a, 7b of fiber tape, which is not adjacent to the others may be cut off.

Furthermore, as in the abovementioned second through fourth preferred embodiments, in a case where multiple-core optical connectors are formed by juxtaposing a plurality of pairs 7 of fiber tapes, the number of pairs 7 of fiber tapes to be juxtaposed may be three or more.

Furthermore, in the abovementioned second through fifth preferred embodiments, when manufacturing multiple-core optical connectors, an adhesive agent is supplied to the connection end face side of optical fibers. However, it is not necessarily limited that the adhesive agent is supplied to the connection end face side of optical fibers. However, by supplying an adhesive agent to the connection end face side of optical fibers, it is possible to prevent any missing of the adhesive agent and/or to prevent air bubbles from entering at least at the connection end face side of optical fibers, and possible to prevent adverse influences due to missing of adhesive agent or due to air bubbles. Therefore, it is preferable that multiple-core optical connectors are produced by supplying an adhesive agent from the connection end face side of optical fibers.

Furthermore, in any one of the abovementioned preferred embodiments, it is constructed that the upper surface 24 of the flat substrate 21 and the upper end of the first and second bare optical fibers 4a, 4b are covered by the pressing member 23 with almost no clearance. However, for example, as shown in FIG. 4(b), there is no problem if a clearance is formed between the upper surface of the flat substrate 21 and the pressing member 23. However, since the connection loss of multiple-core optical connectors with the other optical components is increased by the adhesive agent entering the clearance and other problems arise due to loads applied to the first and second optical fibers 4a, 4b if a clearance is formed between the flat substrate 21 and the pressing member 23, as in the abovementioned preferred embodiments, it is preferable, in order to prevent the connection loss from being increased and to prevent other problems from occurring, that the groove-formed inclined surface 12 at both ends of the array guide grooves 22 is elongated so as to reach the upper surface 24 of the flat substrate 21 so that the upper surface 24 of the flat substrate 21 and the upper ends of the first and second bare optical fibers 4a, 4b can be covered with almost no clearance.

Furthermore, as shown in FIG. 1, optical fiber tapes 6a, 6b of sixteen cores are used in the abovementioned first preferred embodiment, and optical fiber tapes 6a, 6b of eight cores are used in the abovementioned second to fifth preferred embodiments, wherein in the fifth preferred embodiment, an optical fiber tape 6 of eight cores is used. However, the number of cores of each of these optical fiber tapes 6, 6a, 6b may be adequately set to any of four, eight, sixteen, thirty-two cores, etc.

Furthermore, with a multiple-core optical connector according to each of the abovementioned preferred embodiments, the connection end face side (tip end face) 5 is made a perpendicular plane with respect to the respective bare optical fibers 4a, 4b. However, as shown with dashed lines in FIG. 2, the connection end face side 5 may be an oblique plane inclined only θ (for example, θ=8°) with respect to the perpendicular plane. Thus, by forming the connection end face side 5 to be an oblique plane, when a multiple-core optical connector is connected to an optical component at the mating connection side, light propagating from the multiple-core optical connector to the mating connection side, and to the contrary, light propagating from an optical component at the connection mating side to the multiple-core optical connector can be prevented from reversed running by being reflected to the bare optical fibers 4a, 4b of the multiple-core optical connector at the connection end face side or from reversed running by being reflected to an optical line of the optical component at the connection mating side. Accordingly, thus, by preventing light from reversed running, it is possible to suppress adverse influences on optical communications.

INDUSTRIAL APPLICABILITY

As described above, a multiple-core optical connector according to the invention is suitable as a connector which connects a number of optical fibers to each other and as a connector which connects optical fibers to the respective optical waveguides of waveguide elements such as an optical coupler, etc. Furthermore, the manufacturing method according to the invention is suitable for accurately manufacturing multiple-core optical connectors of the invention at a very high efficiency.

What is claimed is:

1. A multiple-core optical connector in which a first optical fiber tape having a plurality of the first optical fibers juxtaposed to be band-like and a second optical fiber tape having a plurality of the second optical fibers juxtaposed to be band-like are disposed so as to overlap each other, said first optical fibers and second optical fibers having the coatings at the tip end side of the respective optical fiber tapes removed are array-converted so as to be alternately arrayed, and arrayed on an optical fiber arraying member, wherein said optical arraying member has a plurality of array guide grooves formed on a flat substrate at an arraying pitch which is roughly coincident with the outer diameter of said respective optical fibers with their coatings removed, said first optical fibers and second optical fibers, the coatings of which are removed, are alternately arrayed in said array guide grooves, a pressing member is provided on the upper side of the arrayed optical fibers at the tip end side thereof, and the respective optical fibers are pressed by said pressing member, placed and fixed in said array guide grooves.

2. The multiple-core optical connector as set forth in claim 1, wherein a filter is provided in an area where said array guide grooves are formed, and said filter is attached to at least any one of said first optical fibers and second optical fibers, which are arrayed in said array guide grooves.

3. The multiple-core optical connector as set forth in claim 1, wherein the rear end side of said pressing member is provided with roundness for lightening the fitting of optical fibers at the pressed side of the optical fibers.

4. The multiple-core optical connector as set forth in claim 1, wherein said pressing member is formed by juxtaposing two or more pressing member pieces in a direction of arraying the optical fibers.

5. The multiple-core optical connector as set forth in claim 1, wherein said array guide grooves are formed at the central area of a flat substrate of the optical fiber arraying member, which is made lower than the upper surface of the flat substrate thereof, and the inclined surface, on which the corresponding array guide grooves are formed, at both outer ends of said array guide grooves are elongated so as to reach the upper surface of said flat substrate, wherein the upper surface of said flat substrate is made roughly coincident with the upper end of the first and second optical fibers arrayed in said array guide grooves, and the upper surface of the corresponding flat substrate and the upper ends of the first and second optical fibers are covered by a pressing member with almost no clearance.

6. The multiple-core optical connector as set forth in claim 1, wherein a tape-red surface is formed at the rear end side of the flat substrate of the optical fiber arraying member in a direction of tinning, the thickness of the corresponding flat substrate.

7. The multiple-core optical connector as set forth in claim 1 wherein a plurality of pairs of fiber tapes in which the first optical fiber tape and the second optical fiber tape are disposed overlapping each other are juxtaposed in a direction of arraying optical fibers and at least one of the sides of the first and second optical fiber tapes of the pairs of fiber tapes, which are adjacent to the other pairs of fiber tapes, is cut off.

8. The multiple-core optical connector as set forth in claim 1, wherein the first and second optical fiber tapes are respectively branched at the terminal side of the incident and outgoing ends.

9. The multiple-core optical connector as set forth in claim 1, wherein the terminal sides of optical fiber tapes composed by juxtaposing a plurality of optical fibers to be band-like are divided into two, wherein one of the two-divided optical fiber tapes is made into the first optical fiber tape while the other side is made into the second optical fiber tape, optical fibers juxtaposed in the first optical fiber tape are made into the first optical fibers, and optical fibers juxtaposed in the second optical fiber tape are made into the second optical fibers.

10. A manufacturing method of multiple-core optical connectors described in claim 1 comprising steps of removing the coatings halfway of the first and second optical fiber tapes; thereafter array-converting the first and second optical fibers, the coating of which are removed, so as to be alternately arrayed, and arraying the same in array guide grooves of an optical fiber arraying member; and thereafter dividing and cutting the fixing part of said pressing member and optical fiber arraying member in the direction crossing the optical fiber arraying direction after a pressing member is provided on the upper surface of the optical fibers to cause the respective optical fibers to be pressed, placed and fixed in said array guide grooves, whereby two multiple-core connectors are produced at one time.

11. A manufacturing method of multiple-core optical connectors described in claim 1 comprising steps of temporarily fixing optical fibers of any one of the first and second optical fiber tapes, the coating of which are removed, in a plurality of guide grooves of the optical fiber arraying members in a state where said optical fibers are placed every other groove: and thereafter arraying every other groove optical fibers of the other one of said first and second optical fiber tapes, the coatings of which are removed, in the array guide grooves remaining every other groove.

12. A manufacturing method of multiple-core optical connectors described in claim 1 comprising steps of pressing optical fibers by a pressing member in a state where the optical fibers of any one of the first and second optical fiber tapes, the coatings of which are removed are arrayed every other groove in a plurality of array guide grooves of the optical fiber arraying member; and thereafter inserting the optical fibers of the other one of the first and second optical fiber tapes the coatings of which are removed, from the upper side or the lower side of the optical fibers pressed by said pressing member into the clearance formed by said pressing member and said array guide grooves remaining every other groove.

13. The manufacturing method of multiple-core optical connectors as set forth in claim 11, wherein when peeling off the coatings of the first and second optical fiber tapes, a part of the coatings of at least one of said optical fiber tapes is not removed and is caused to slide toward the tip end side of optical fibers in order to leave the coating at the tip end side of the optical fibers as a remaining coating, and thereafter the root side of the optical fibers the coatings of which are removed, is arrayed in the optical fiber arraying member.

14. The manufacturing method of multiple-core optical connectors as set forth in claim 13, wherein a plurality of optical fiber tapes, a part of the coatings of which is left over, are prepared and juxtaposed in a direction of arraying optical fibers, and said optical fiber tapes are disposed with the position of the remaining coatings of the adjacent optical fiber tapes slid in its lengthwise direction of optical fibers, and thereafter the optical fibers are arrayed in the optical fiber arraying member.

15. A manufacturing method of multiple-core optical connectors described in claim 1 comprising steps of supplying an adhesive agent to the connection end face side of the corresponding optical fibers after the optical fibers arrayed in the array guide grooves of the optical fiber arraying member are pressed by a pressing member; and fixing optical fibers in said array guide grooves.

16. A manufacturing method of multiple-core optical connectors described in claim 1 comprising steps of dividing, into two, optical fiber tapes composed by juxtaposing a plurality of optical fibers to be band-like; and making one of the two-divided optical fiber tapes into the first optical fiber tape while making the other optical fiber tape into the second optical fiber tape.

17. The manufacturing method of multiple-core optical connectors as set forth in claim 11, wherein when peeling off the coatings of the first and second optical fiber tapes, a part of the coatings of at least one of said optical fiber tapes is not removed and is caused to slide toward the tip end side of optical fibers in order to leave the coating at the tip end side of the optical fibers as a remaining coating, and thereafter the root side of the optical fibers, the coatings of which are removed, is arrayed in the optical fiber arraying member.

18. The multiple-core optical connector as set forth in claim 5, wherein a tapered surface is formed at the rear end side of the flat substrate of the optical fiber arraying member in a direction of thinning the thickness of the corresponding flat substrate.

19. The multiple-core optical connector as set forth in claim 5, wherein a plurality of pairs of fiber tapes in which the first optical fiber tape and the second optical fiber tape are disposed overlapping each other are juxtaposed in a direction of arraying optical fibers, and at least one of the sides of the first and second optical fiber tapes of the pairs of fiber tapes, which are adjacent to the other pairs of fiber tapes, is cut off.

20. The multiple-core optical connector as set forth in claim 5, wherein the first and second optical fiber tapes are respectively branched at the terminal side of the incident and outgoing ends.

* * * * *

UNITED STATES PATENT AND TRADEMARK OFFICE
CERTIFICATE OF CORRECTION

PATENT NO. : 6,045,269

DATED : April 4, 2000

INVENTOR(S) : Watanabe et al.

It is certified that error appears in the above-identified patent and that said Letters Patent is hereby corrected as shown below:

Front page, in the title: "Multicore" should read -- Multiple core --.

Front page, under the reference [51], "G02B 6/38" should read -- G02B 6/40 --.

Col. 1, line 41: "51" should read -- 5, --.

Col. 2, line 36: "light of of" should read -- light of --.

Col. 3 line 5-6: "optical fiber fiber" should read -- optical fiber --.

Col. 12, line 23: "thereof, For" should read -- thereof. For --.

Col. 12, line 25: " cores,," should read -- cores, --

Col. 22, line 45: " 22" should read -- 21 --.

Col. 26, line 5: " 22" should read -- 21 --.

Col. 28, line 12: "embodiment,," should read -- embodiment, --.

Col. 30, Claim 6, line 26: "tape-red" should read -- tapered --.

UNITED STATES PATENT AND TRADEMARK OFFICE
CERTIFICATE OF CORRECTION

PATENT NO.   : 6,045,269

DATED        : April 4, 2000

INVENTOR(S) : Watanabe et al.

It is certified that error appears in the above-identified patent and that said Letters Patent is hereby corrected as shown below:

Col. 30, Claim 6, line 28: "tinning" should read -- thinning --.

Col. 31, Claim 13, line 28: "fibers the" should read -- fibers, the --.

Signed and Sealed this

Fifteenth Day of May, 2001

*Attest:*

NICHOLAS P. GODICI

*Attesting Officer*   Acting Director of the United States Patent and Trademark Office